US012742849B2

(12) United States Patent
Dai et al.

(10) Patent No.: US 12,742,849 B2
(45) Date of Patent: Sep. 22, 2026

(54) POSITION ESTIMATION USING MOBILE ANCHOR

(71) Applicant: QUALCOMM Incorporated, San Diego, CA (US)

(72) Inventors: Jing Dai, Beijing (CN); Chao Wei, Beijing (CN); Hui Guo, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/291,898

(22) PCT Filed: Sep. 21, 2021

(86) PCT No.: PCT/CN2021/119487

§ 371 (c)(1),
(2) Date: Jan. 24, 2024

(87) PCT Pub. No.: WO2023/044599

PCT Pub. Date: Mar. 30, 2023

(65) Prior Publication Data

US 2024/0377497 A1 Nov. 14, 2024

(51) Int. Cl.

| | |
|---|---|
| ***G01S 5/02*** | (2010.01) |
| ***G01S 5/00*** | (2006.01) |
| ***G01S 5/06*** | (2006.01) |

(52) U.S. Cl.

CPC .......... *G01S 5/0249* (2020.05); *G01S 5/0081* (2013.01); *G01S 5/06* (2013.01); *G01S 5/0027* (2013.01); *G01S 5/0036* (2013.01)

(58) Field of Classification Search

None

See application file for complete search history.

(56) References Cited

U.S. PATENT DOCUMENTS

2001/0046869 A1* 11/2001 Cedervall ................. G01S 5/10 455/406
2015/0263837 A1* 9/2015 Patel ..................... H04L 5/0048 370/329

(Continued)

FOREIGN PATENT DOCUMENTS

| | | | |
|---|---|---|---|
| CN | 103261911 | A | 8/2013 |
| CN | 109845173 | A | 6/2019 |

(Continued)

OTHER PUBLICATIONS

X. Lin et al., "Positioning for the Internet of Things: A 3GPP Perspective," in IEEE Communications Magazine, vol. 55, No. 12, pp. 179-185, Dec. 2017, doi: 10.1109/MCOM.2017.1700269. (Year: 2017).*

(Continued)

*Primary Examiner* — Bernarr E Gregory
(74) *Attorney, Agent, or Firm* — Thien T. Nguyen

(57) ABSTRACT

The position of a target user equipment (UE) is determined using a set of Reference Signal Time Difference (RSTD) measurements that includes at least three RSTD measurements generated at different times by the target UE. Each RSTD measurement is produced based on positioning reference signals (PRS) transmitted by a stationary anchor entity and corresponding PRS transmitted by a moving mobile anchor entity. At least two anchor-to-anchor receive-transmit (RxTx) time difference measurements are generated by an anchor entity, wherein each anchor-to-anchor RxTx time difference measurement is associated with the RSTD measurements, and there are fewer anchor-to-anchor RxTx time difference measurements than RSTD measurements. The position estimate of the target UE is determined based on the set of RSTD measurements and the at least two anchor-to-anchor RxTx time difference measurements.

30 Claims, 20 Drawing Sheets

(56) References Cited

U.S. PATENT DOCUMENTS

| | | | | |
|---|---|---|---|---|
| 2018/0063678 | A1* | 3/2018 | Zhu | H04W 64/00 |
| 2018/0343056 | A1 | 11/2018 | Radulescu et al. | |
| 2019/0045479 | A1 | 2/2019 | Yoon et al. | |
| 2021/0149009 | A1* | 5/2021 | Modarres Razavi | H04W 64/00 |

FOREIGN PATENT DOCUMENTS

| | | | |
|---|---|---|---|
| EP | 3742828 | A1 | 11/2020 |
| GB | 2581480 | A | 8/2020 |
| JP | 2008249550 | A | 10/2008 |
| JP | 2021508038 | A | 2/2021 |
| KR | 20210018010 | A | 2/2021 |
| WO | 2014019125 | A1 | 2/2014 |

OTHER PUBLICATIONS

International Search Report and Written Opinion—PCT/CN2021/119487—ISA/EPO—Jun. 10, 2022.

Qualcomm Incorporated: "Enhancements on Timing Error Mitigations for Improved Accuracy", 3GPP TSG RAN WG1 #104b-e, R1-2103170, e-Meeting, Apr. 12-20, 2021, Apr. 7, 2021 (Apr. 7, 2021) Sections 2.1, 2.3.1, 4.2, pp. 1-20, the whole document.

Ericsson: "Techniques Mitigating Rx/Tx Timing Delays", 3GPP TSG-RAN WG1 Meeting #106-e, R1-2108164, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 6, 2021, 24 Pages, XP052038845, Introduction.

Supplementary European Search Report—EP21957746—Search Authority—Munich—Jun. 24, 2025.

ZTE: Positioning Accuracy Improvement by Mitigating Timing Delay, 3GPP TSG RAN WG1 Meeting #106-e, R1-2106549, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 7, 2021, 10 Pages, XP052041696, Section 2.

Taiwan Search Report—TW111129330—TIPO—Jan. 5, 2026.

* cited by examiner

POSITION ESTIMATION USING MOBILE ANCHOR

CROSS-REFERENCE TO RELATED APPLICATIONS

This application is a National Stage Application filed under 35 U.S.C. § 371 of PCT International Application Serial No. PCT/CN2021/119487 entitled "METHOD AND APPARATUS FOR POSITION ESTIMATION USING MOBILE ANCHOR," and filed on Sep. 21, 2021, which is expressly incorporated by reference herein in its entirety.

BACKGROUND

Field

The subject matter disclosed herein relates generally to the field of wireless communications, and more specifically to techniques for supporting positioning.

Information

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The position of a target user equipment (UE) is determined using a set of Reference Signal Time Difference (RSTD) measurements that includes at least three RSTD measurements generated at different times by the target UE. Each RSTD measurement is produced based on positioning reference signals (PRS) transmitted by a stationary anchor entity and corresponding PRS transmitted by a moving mobile anchor entity. At least two anchor-to-anchor receive-transmit (RxTx) time difference measurements are generated by an anchor entity, wherein each anchor-to-anchor RxTx time difference measurement is associated with the RSTD measurements, and there are fewer anchor-to-anchor RxTx time difference measurements than RSTD measurements. The position estimate of the target UE is determined based on the set of RSTD measurements and the at least two anchor-to-anchor RxTx time difference measurements.

In one implementation, a method of operating a position estimation entity for determining a position of a target user equipment (UE), includes obtaining a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; obtaining at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determining a position estimate of the target UE based on the set of RSTD measurements and the at least two anchor-to-anchor RxTx time difference measurements.

In one implementation, a position estimation entity configured for determining a position of a target user equipment (UE), includes a memory; at least one external interface; and at least one processor communicatively coupled to the memory and the at least one external interface, the at least one processor configured to: obtain a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; obtain at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determine a position estimate of the target UE based on the set of RSTD measurements and the at least two anchor-to-anchor RxTx time difference measurements.

In one implementation, a position estimation entity configured for determining a position of a target user equipment (UE), includes means for obtaining a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; means for obtaining at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and means for determining a position estimate of the target UE based on the set of RSTD measurements and the at least two anchor-to-anchor RxTx time difference measurements.

In one implementation, a non-transitory storage medium including program code stored thereon, the program code is operable to configure at least one processor in a position estimation entity for determining a position of a target user equipment (UE), the program comprising instructions to: obtain a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; obtain at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determine a position estimate of the target UE based on the set of RSTD measurements and the at least two anchor-to-anchor RxTx time difference measurements.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
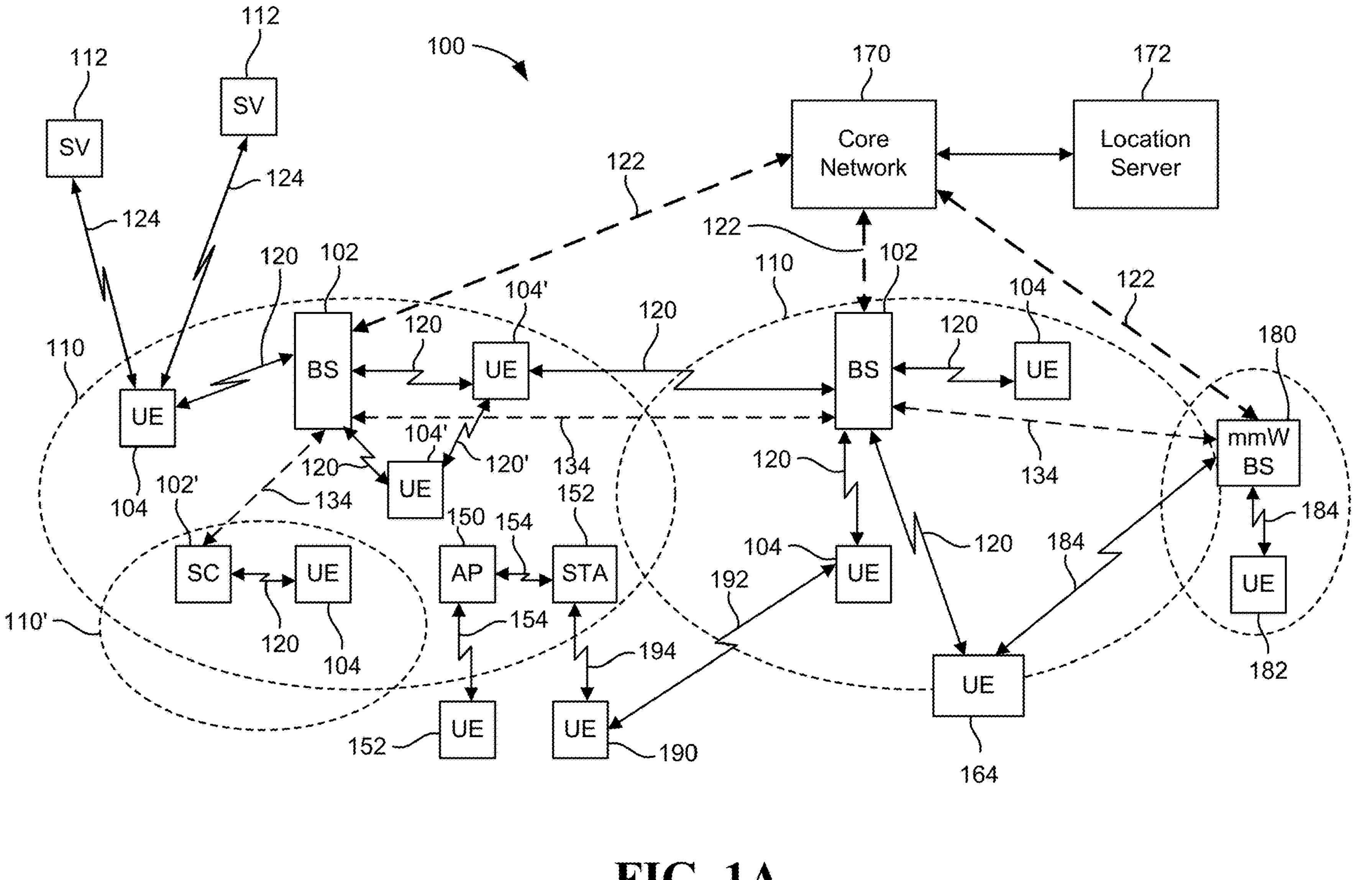
FIG. 1A illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel. Additionally, a communication link through which UEs can send signals to other UEs is called a sidelink (SL) channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1A illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may further include a sidelink channel 120' that may be used to directly connect multiple UEs 104, e.g., illustrated in FIG. 1A as UEs 104'. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1A, one or more Earth orbiting satellite positioning system (SPS) space vehicles (SVs) 112 (e.g., satellites) may be used as an independent source of location information for any of the illustrated UEs (shown in FIG. 1A as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1A, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 1B:
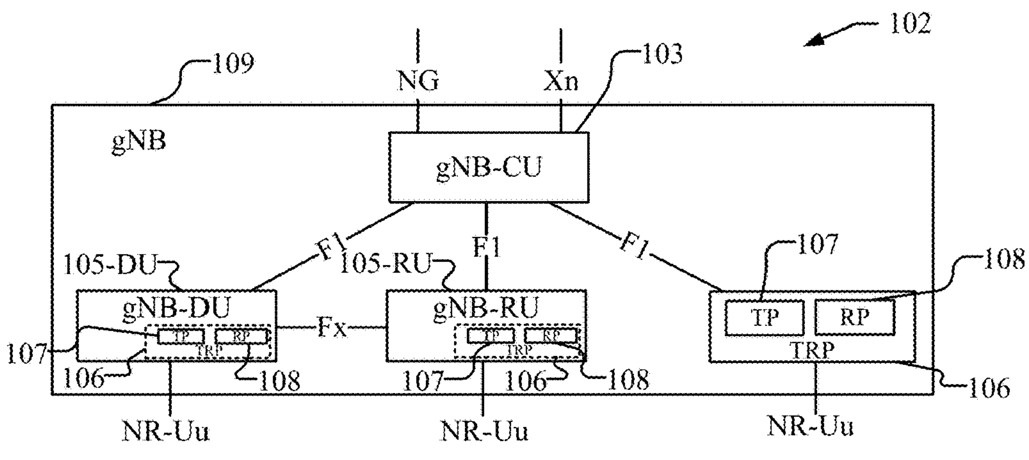
FIG. 1B shows an architecture diagram of a base station node that may be within FIG. 1A.

FIG. 1B shows an architecture diagram of an NG-RAN node, e.g., base station 102, that may be within an NG-RAN in FIG. 1A, e.g., as a separate entity or as part of another gNB. The base station 102 may be a gNB 109, according to one implementation. The architecture shown in FIG. 1B, for example, may be applicable to any gNB 109 in FIG. 1A.

As illustrated, gNB 109 may include a gNB Central Unit (gNB-CU) 103, a gNB Distributed Unit (gNB-DU) 105-DU, a gNB Remote Unit (gNB-RU) 105-RU, which may be physically co-located in the gNB 109 or may be physically separate. The gNB-CU 103 is a logical or physical node hosting support for Radio Resource Control (RRC), Service Data Adaptation Protocol (SDAP) and Packet Data Convergence Protocol (PDCP) protocols of the gNB 109 used over the NR Uu air interface and controlling the operation of one or more gNB-DUs and/or gNB-RUs. The gNB-CU 103 terminates an F1 interface connected with a gNB-DU and in some implementations, an F1 interface connected with a gNB-RU. As illustrated, the gNB-CU 103 may communicate with an AMF via an NG interface. The gNB-CU 103 may further communicate with one or more other gNBs 109 via an Xn interface. The gNB-DU 105-DU is a logical or physical node hosting support for Radio Link Control (RLC), Medium Access Control (MAC) and Physical (PHY) protocol layers used over the NR Uu air interface of the gNB 109, operation of which is partly controlled by gNB-CU 103. The gNB-DU terminates the F1 interface connected with the gNB-CU 103, and may terminate a lower layer split point interface Fx with a gNB-RU. The gNB-RU 105-RU may be based on a lower layer function split and is a logical or physical node hosting support for lower layer functions, such as PHY and Radio Frequency (RF) protocol layers used over the NR Uu air interface of the gNB 109, operation of which is partly controlled by gNB-CU 103 and/or gNB-DU 105-DU. The gNB-RU 105-RU terminates the Fx interface connected with the gNB-DU 105-DU and in some implementations may terminate the F1 interface connected with the gNB-CU 103.

The gNB-CU 103 requests positioning measurements (e.g. E-CID) to the gNB-DU 105-DU and/or gNB-RU 105-RU. The gNB-DU 105-DU and/or gNB-RU 105-RU may report the measurements back to the gNB-CU 103. A gNB-DU 105-DU or gNB-RU 105-RU may include positioning measurement functionality. It should be understood that a separate measurement node is not precluded.

Additionally, as illustrated in FIG. 1B, gNB 109 may include a Transmission Point (TP) 107 and a Reception Point (RP) 108 combined into a Transmission Reception Point (TRP) 106, which may be physically or logically located in the gNB 109. The gNB-CU 103 may be configured to communicate with the TP 107 and RP 108, e.g., via F1 interfaces. The gNB-CU 103, thus, controls one or more TPs 107 and RPs 108 which are accessible from the gNB-CU 103 via an F1 interface.

In some embodiments, the base station 102 (or gNB 109) may comprise a subset of the elements shown in FIG. 1B. For example, the NG-RAN node 102 may comprise the gNB-CU 103 but may not include one or more of gNB-DU 105-DU and gNB-RU 105-RU, RP 108, or TP 107. Alternatively, base station 102 may include one or more of gNB-DU 105-DU and, RP 108 or TP 107 but may not include gNB-RU 105-RU. Further, the elements shown in FIG. 1B may be logically separate but physically co-located or may be partially or completely physically separate. For example, one or more of gNB-DU 105-DU and/or gNB-RU 105-RU, RP 108 or TP 107 may be physically separate from gNB-CU 103 or may be physically combined with gNB-CU 103. In the case of physical separation, the F1 or Fx interface may define signaling over a physical link or connection between two separated elements. In some implementations, gNB-CU 103 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 105-DU and/or gNB-RU 105-RU to support NR Uu air interface signaling for control plane and user plane, respectively. However, only the gNB-CU-CP may interact with TPs 107 and RPs 108 to support and control location related communication.

Protocol layering between the gNB-CU 103 and the TP 107, and RP 108 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 103 may comprise all location related procedures on NG, Xn, and NR-Uu interfaces. For example, the location procedures between an AMF and the base station 102 may use NGAP. The location procedures between base station 102 and other NG-RAN nodes, e.g., gNBs 109, may use XnAP or a protocol above XnAP, such as an extended NR Positioning Protocol A (NRPPa) as defined in 3GPP TS 38.455. The location procedures between base station 102 and UE 104 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC (LPP) messages may be carried in an UL/DL RRC (LPP) Message Transfer.

Figure 2A:
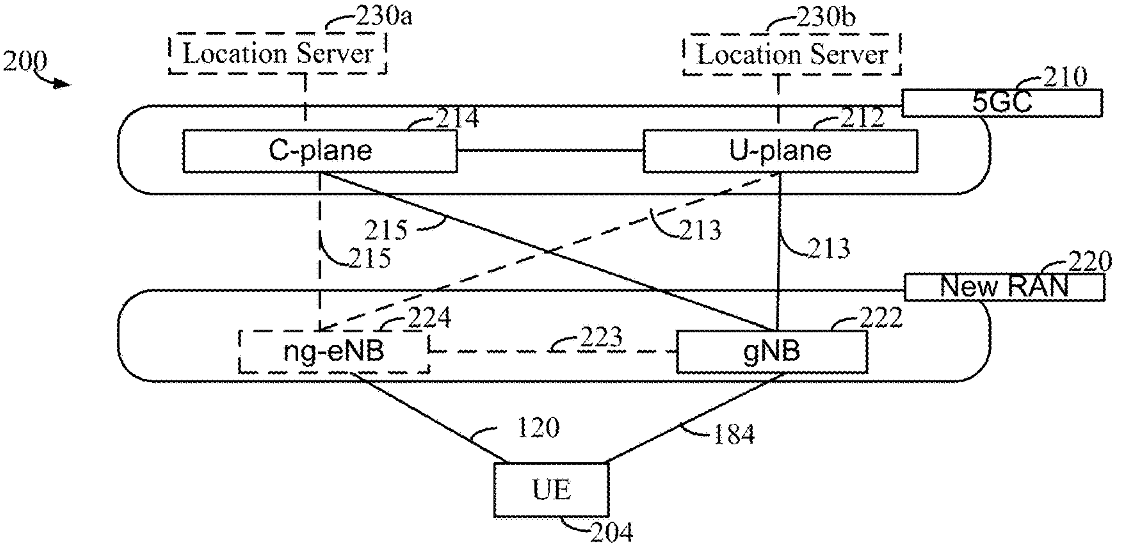
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include one or more location servers 230*a*, 230*b* (sometimes collectively referred to as location server 230) (which may correspond to location server 172), which may be in communication with the control plane functions 214 and user plane functions 212, respectively, in the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network, or alternatively may be external to the core network (e.g., a third party server, such as an original equipment manufacturer (OEM) server or service server).

Figure 2B:
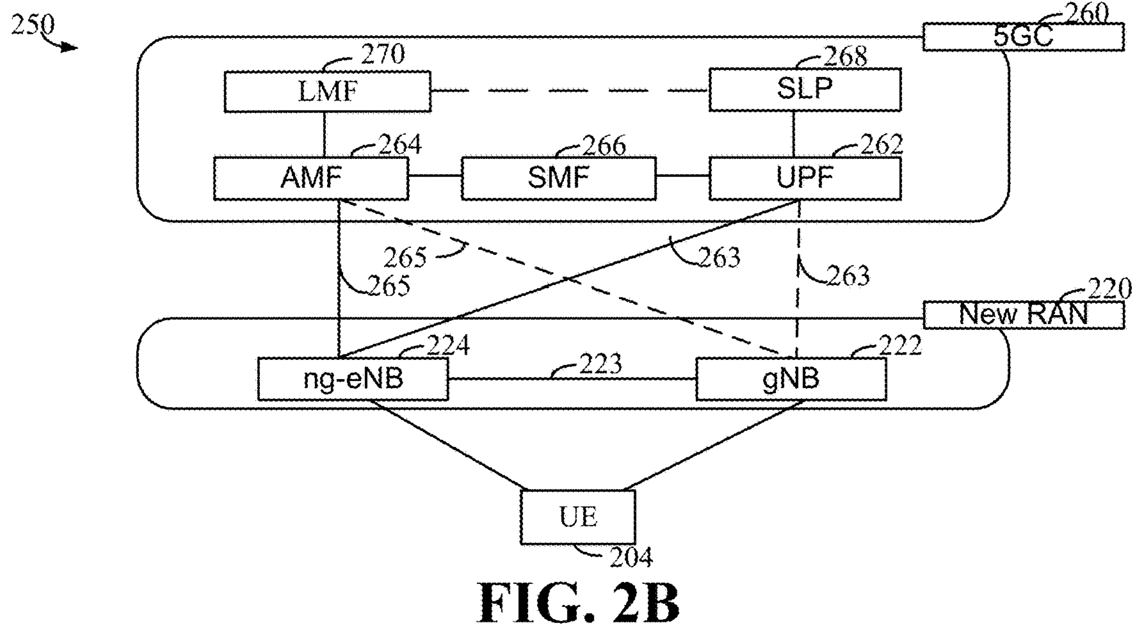

FIG. 2B illustrates another example wireless network structure 250. For example, an 5GC 260 (also referred to as a "NGC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1A). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated).

Figure 3A:
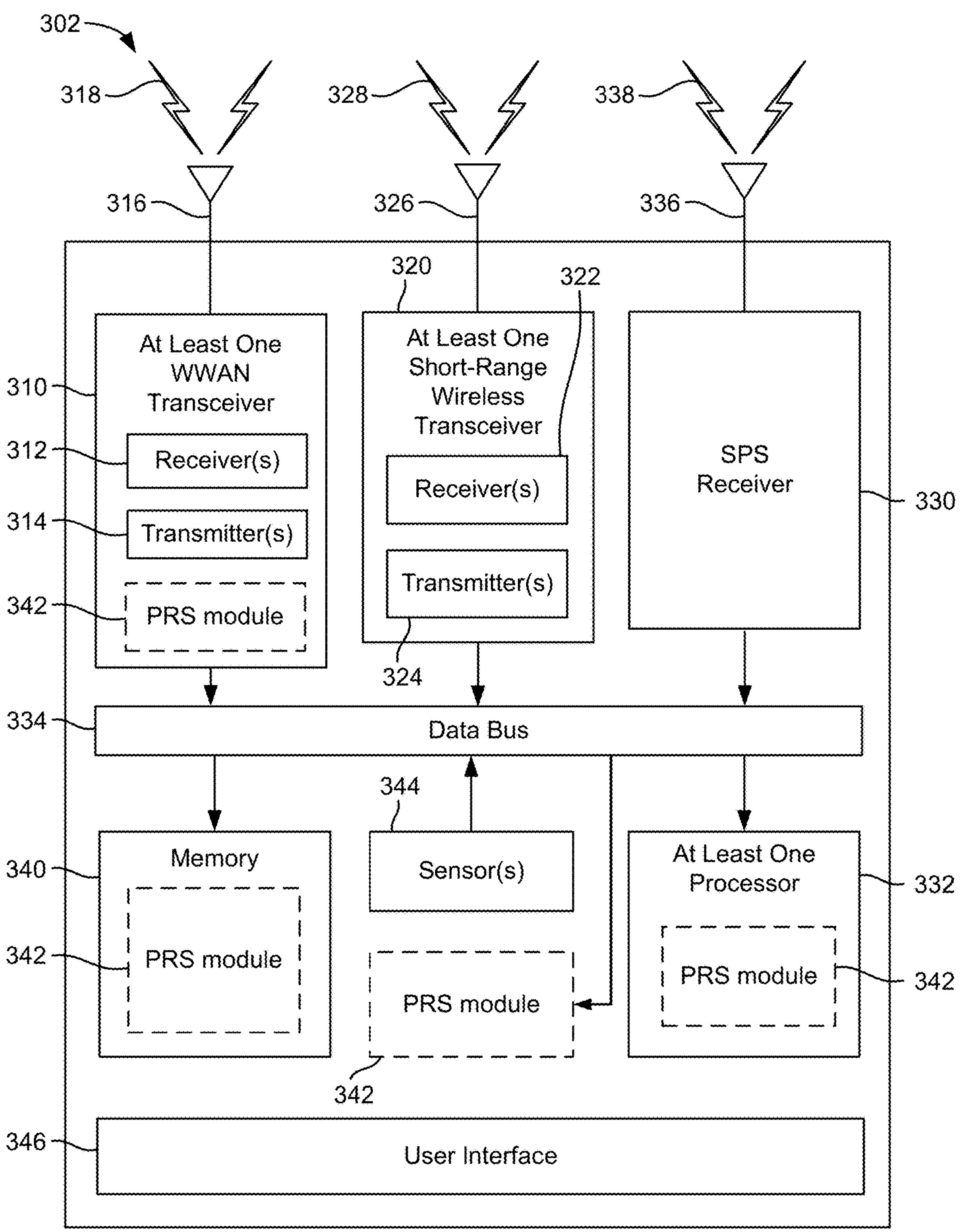
FIGS. 3A to 3C are simplified block diagrams of several sample aspects of components that may be employed in a user equipment (UE), a base station, and a network entity, respectively, and configured to support communications as taught herein.
Figure 3B:
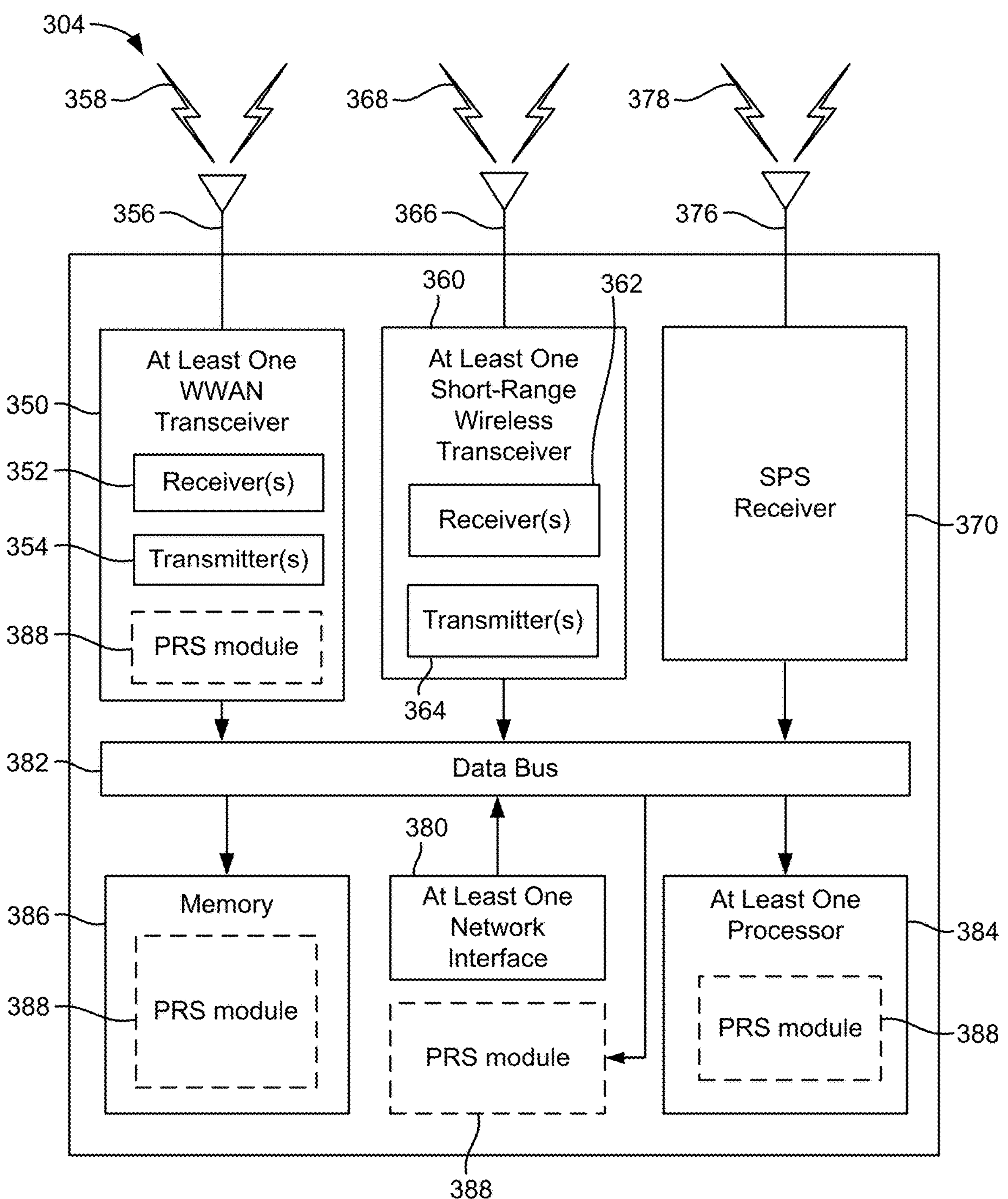
Figure 3C:
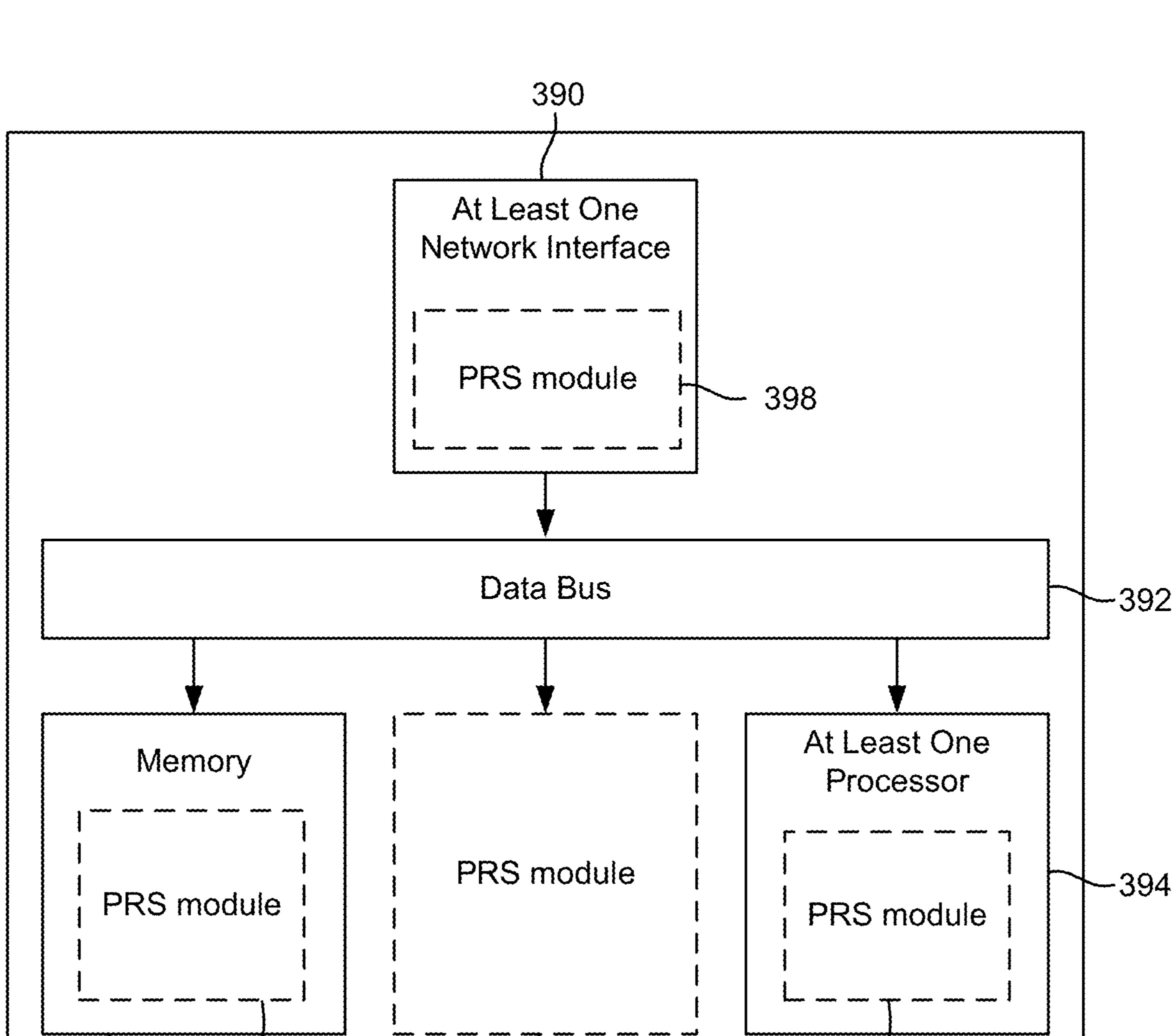

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include PRS modules 342, 388, and 398, respectively. The PRS modules 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the PRS modules 342, 388, and 398 may be external to the processors 332, 384, and 394 (e.g., part of a modem processing system, integrated with another processing system, etc.). Alternatively, the PRS modules 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the PRS module 342, which may be, for example, part of the at least one WWAN transceiver 310, the memory component 340, the at least one processor 332, or any combination thereof, or may be a standalone component. FIG. 3B illustrates possible locations of the PRS module 388, which may be, for example, part of the at least one WWAN transceiver 350, the memory component 386, the at least one processor 384, or any combination thereof, or may be a standalone component. FIG. 3C illustrates possible locations of the PRS module 398, which may be, for example, part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, the at least one short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, onto mapping physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection. Similar to the functionality described in connection with the downlink transmission by the base station 304, the at least one processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated components may have different functionality in different designs. In particular, while some components (e.g., the memory and processor components) are generally required for operation of a computing device, other various components in FIGS. 3A to 3C are optional and may vary by implementation. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability) or may omit the short-range wireless transceiver(s) 320 (e.g., cellular-only, etc.) or may omit the SPS receiver 330 or may omit the sensor(s) 344, and so on. In another example, in case of FIG. 3B, a particular implementation of base station 304 may omit the WWAN transceiver(s) 350 (e.g., a Wi-Fi hotspot AP without cellular capability) or may omit the short-range wireless transceiver(s) 360 (e.g., cellular-only, etc.) or may omit the SPS receiver 370 or may omit, and so on.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the PRS modules 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4A:
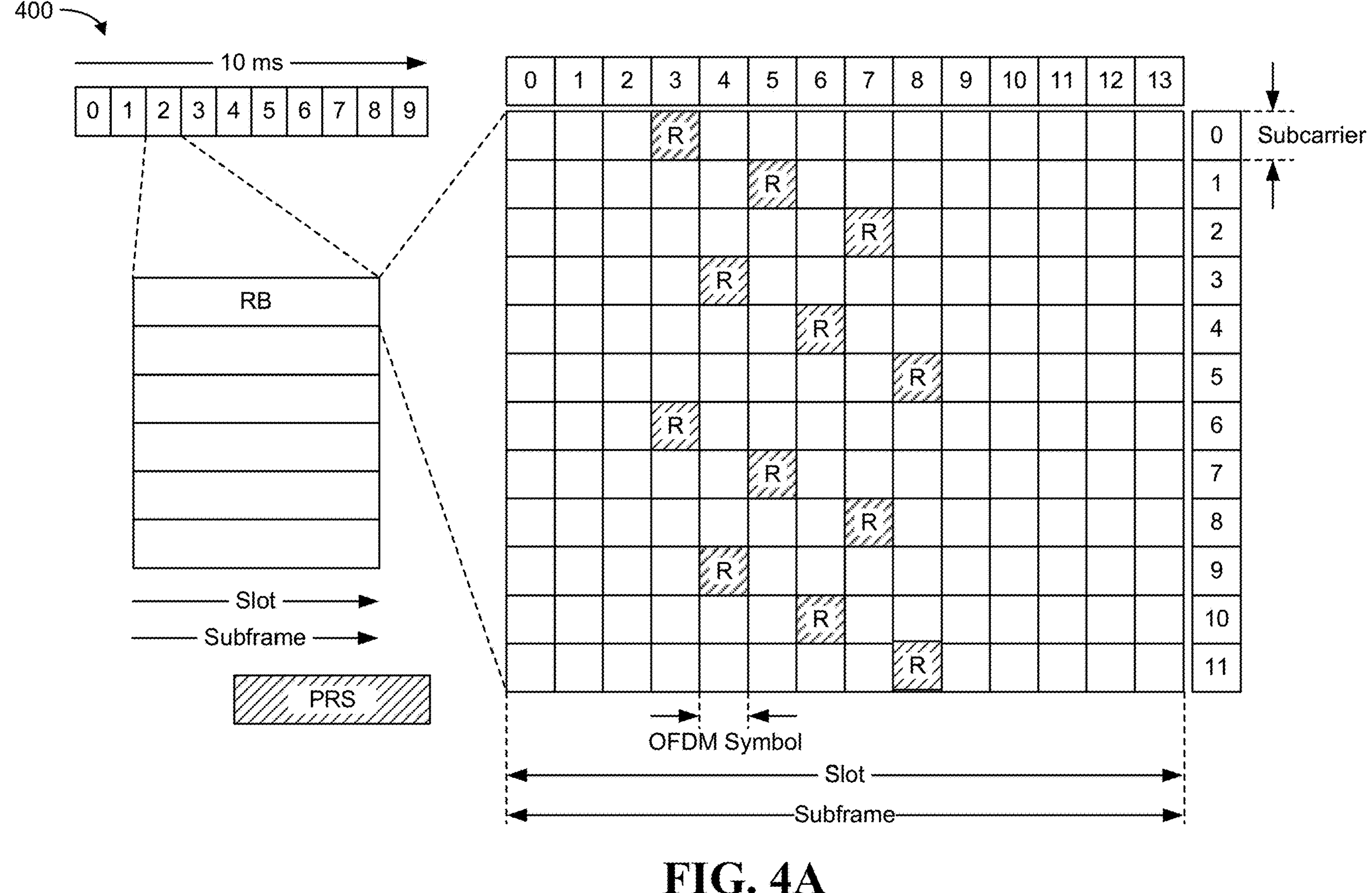
FIGS. 4A to 4D are diagrams illustrating example frame structures and channels within the frame structures, according to aspects of the disclosure.
Figure 4B:
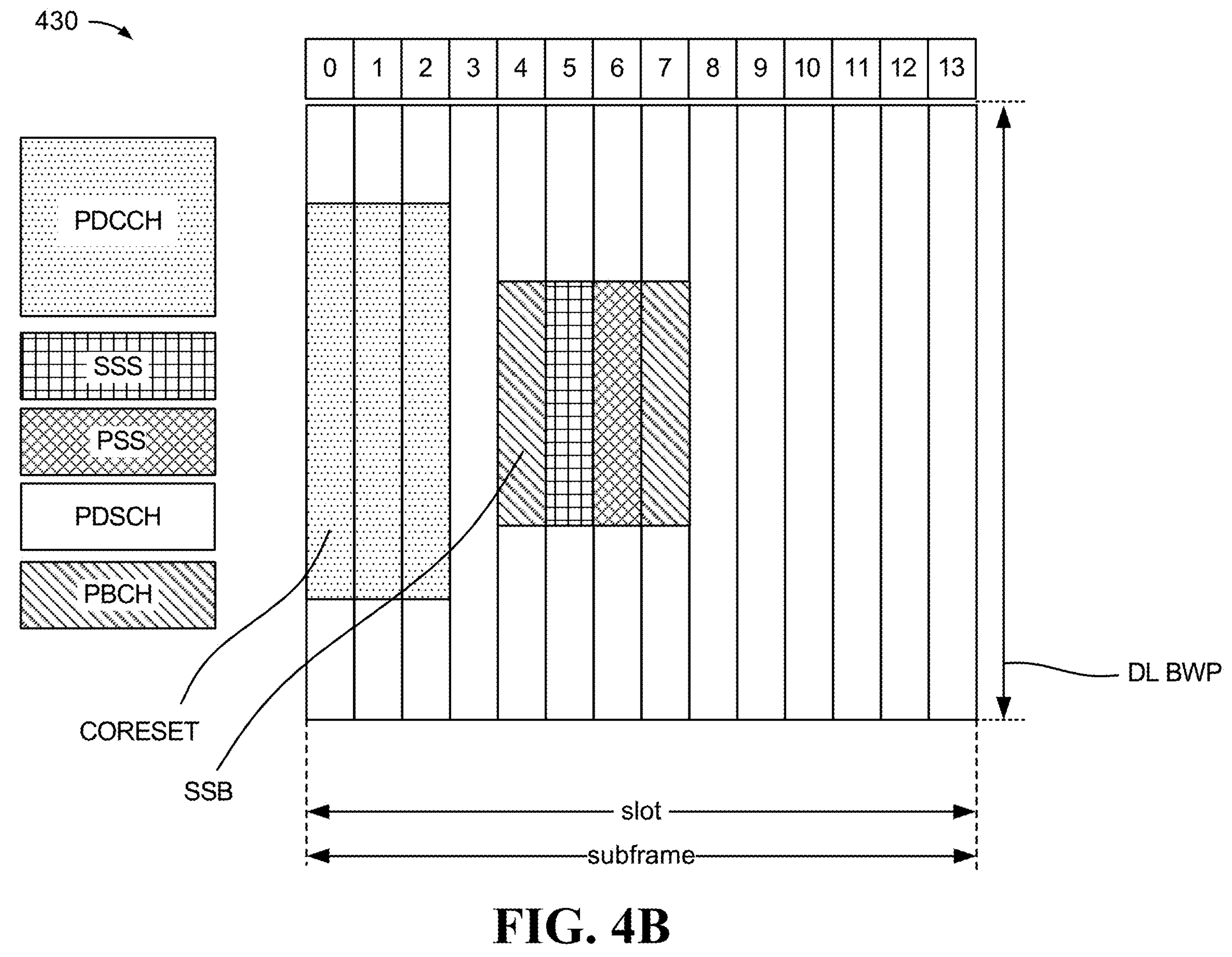
Figure 4C:
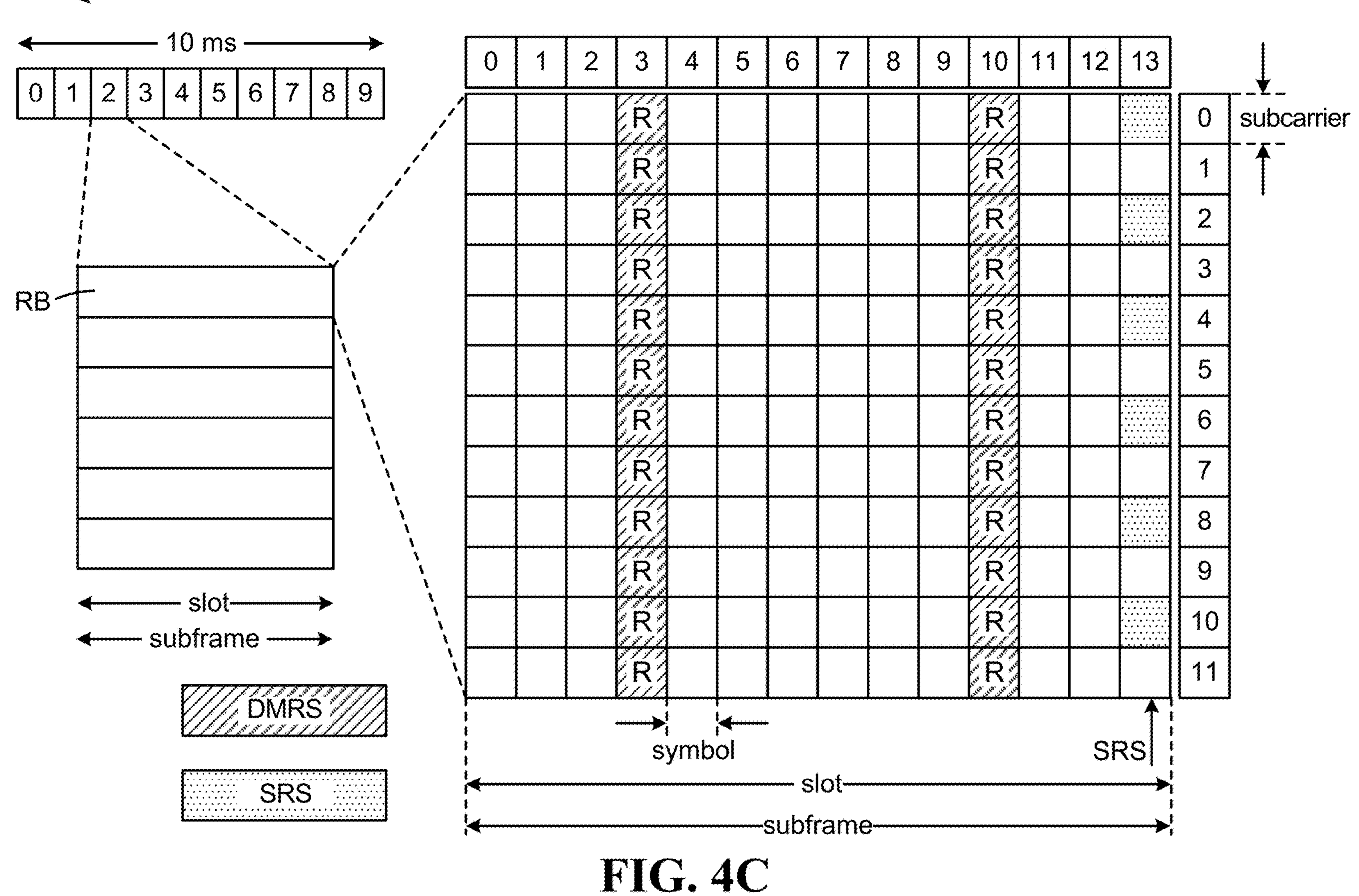
Figure 4D:
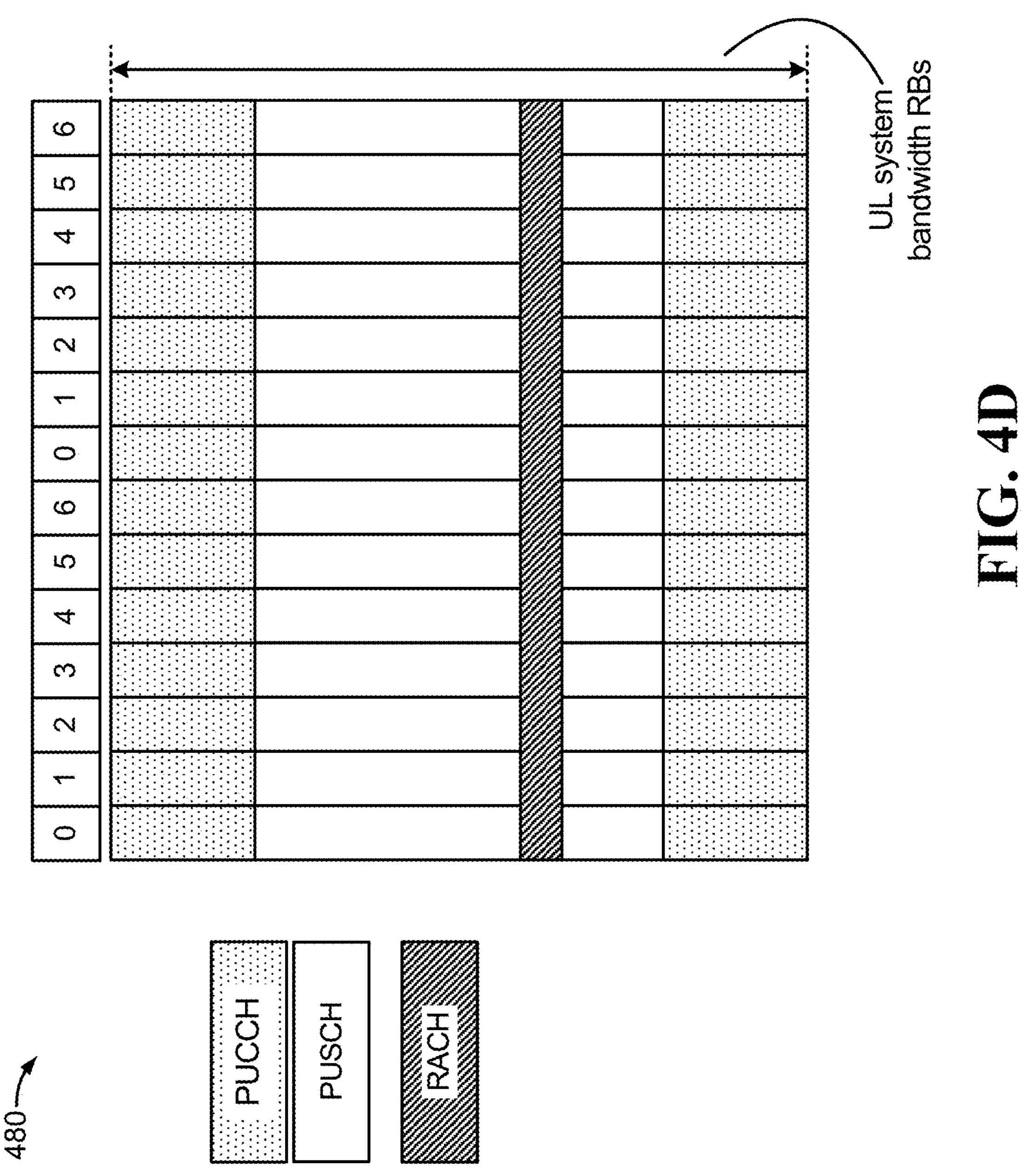

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHZ (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include positioning reference signals (PRS), tracking reference signals (TRS), phase tracking reference signals (TRS), cell-specific reference signals (CRS), channel state information reference signals (CSI-RS), demodulation reference signals (DMRS), primary synchronization signals (PSS), secondary synchronization signals (SSS), synchronization signal blocks (SSBs), etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 4-symbol comb-2: {0, 1, 0, 1}; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 4D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
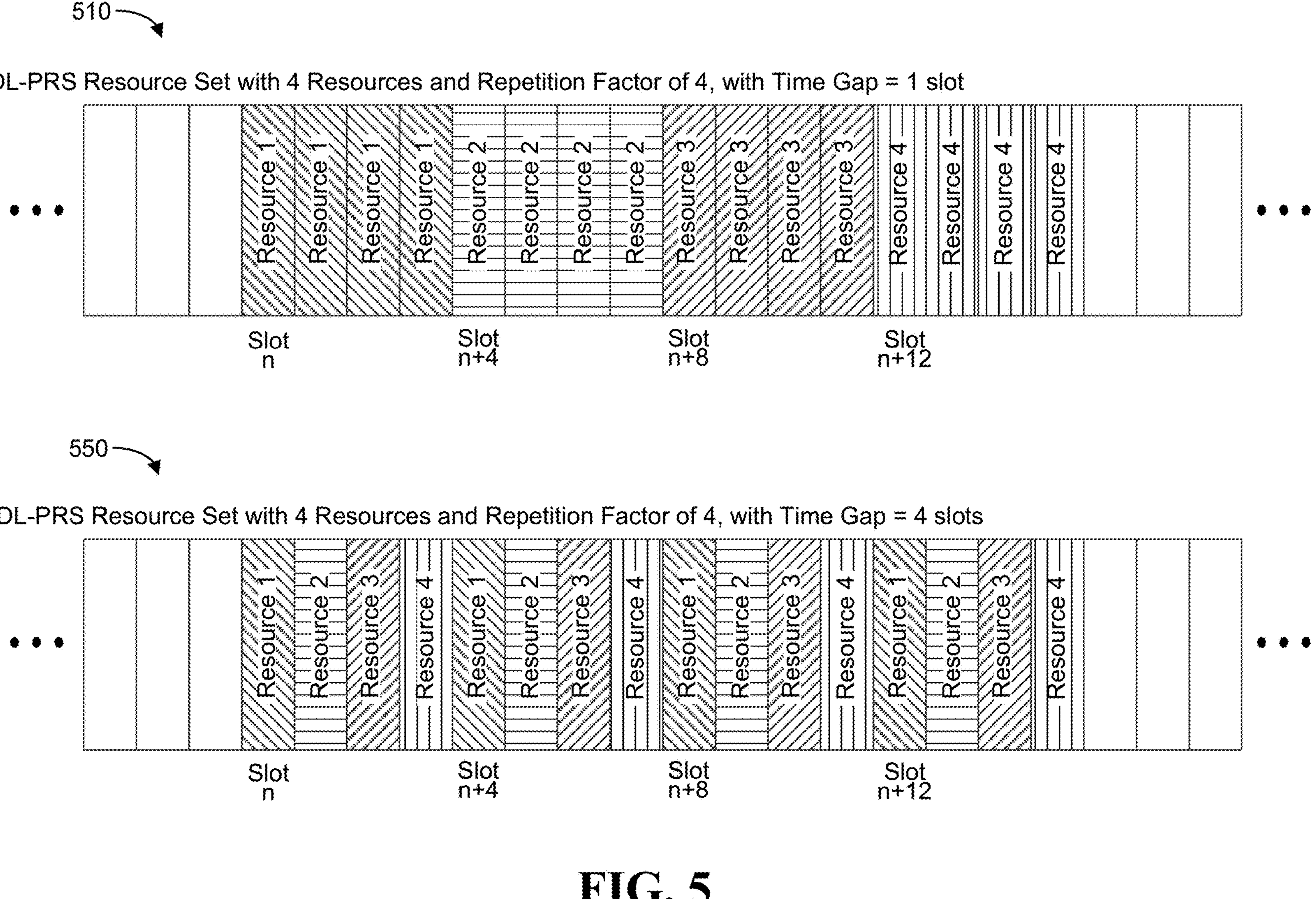
FIG. 5 is a diagram of example positioning reference signal (PRS) resource sets having different time gaps, according to aspects of the disclosure.

FIG. 5 is a diagram of example PRS resource sets having different time gaps, according to aspects of the disclosure. In the example of FIG. 5, time is represented horizontally and frequency is represented vertically. Each block represents a slot in the time domain and some bandwidth in the frequency domain.

FIG. 5 illustrates two DL-PRS resource set configurations, a first DL-PRS resource set configuration 510 and a second DL-PRS resource set configuration 550. Each DL-PRS resource set configuration 510 and 550 comprises four PRS resources (labeled "Resource 1," "Resource 2," "Resource 3," and "Resource 4") and has a repetition factor of four. A repetition factor of four means that each of the four PRS resources is repeated four times (i.e., is transmitted four times) within the DL-PRS resource set. That is, there are four repetitions of each of the four PRS resources within the DL-PRS resource set.

The DL-PRS resource set configuration 510 has a time gap of one slot, meaning that each repetition of a PRS resource (e.g., "Resource 1") starts on the first slot after the previous repetition of that PRS resource. Thus, as illustrated by DL-PRS resource set configuration 510, the four repetitions of each of the four PRS resources are grouped together. Specifically, the four repetitions of PRS resource "Resource 1" occupy the first four slots (i.e., slots n to n+3) of the DL-PRS resource set configuration 510, the four repetitions of PRS resource "Resource 2" occupy the second four slots (i.e., slots n+4 to n+7), the four repetitions of PRS resource "Resource 3" occupy the third four slots (i.e., slots n+8 to n+11), and the four repetitions of PRS resource "Resource 4" occupy the last four slots (i.e., slots n+12 to n+15).

In contrast, the DL-PRS resource set configuration 550 has a time gap of four slots, meaning that each repetition of a PRS resource (e.g., "Resource 2") starts on the fourth slot after the previous repetition of that PRS resource. Thus, as illustrated by DL-PRS resource set configuration 550, the four repetitions of each of the four PRS resources are scheduled every fourth slot. For example, the four repetitions of PRS resource "Resource 1" occupy the first, fifth, ninth, and thirteenth slots (i.e., slots n, n+4, n+8, and n+12) of the DL-PRS resource set configuration 550.

Note that the time duration spanned by one DL-PRS resource set containing repeated DL-PRS resources, as illustrated in FIG. 5, should not exceed the PRS periodicity. In addition, UE receive beam sweeping, for receiving/measuring the DL-PRS resource set, is not specified, but rather, depends on UE implementation.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (RxTx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and RxTx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
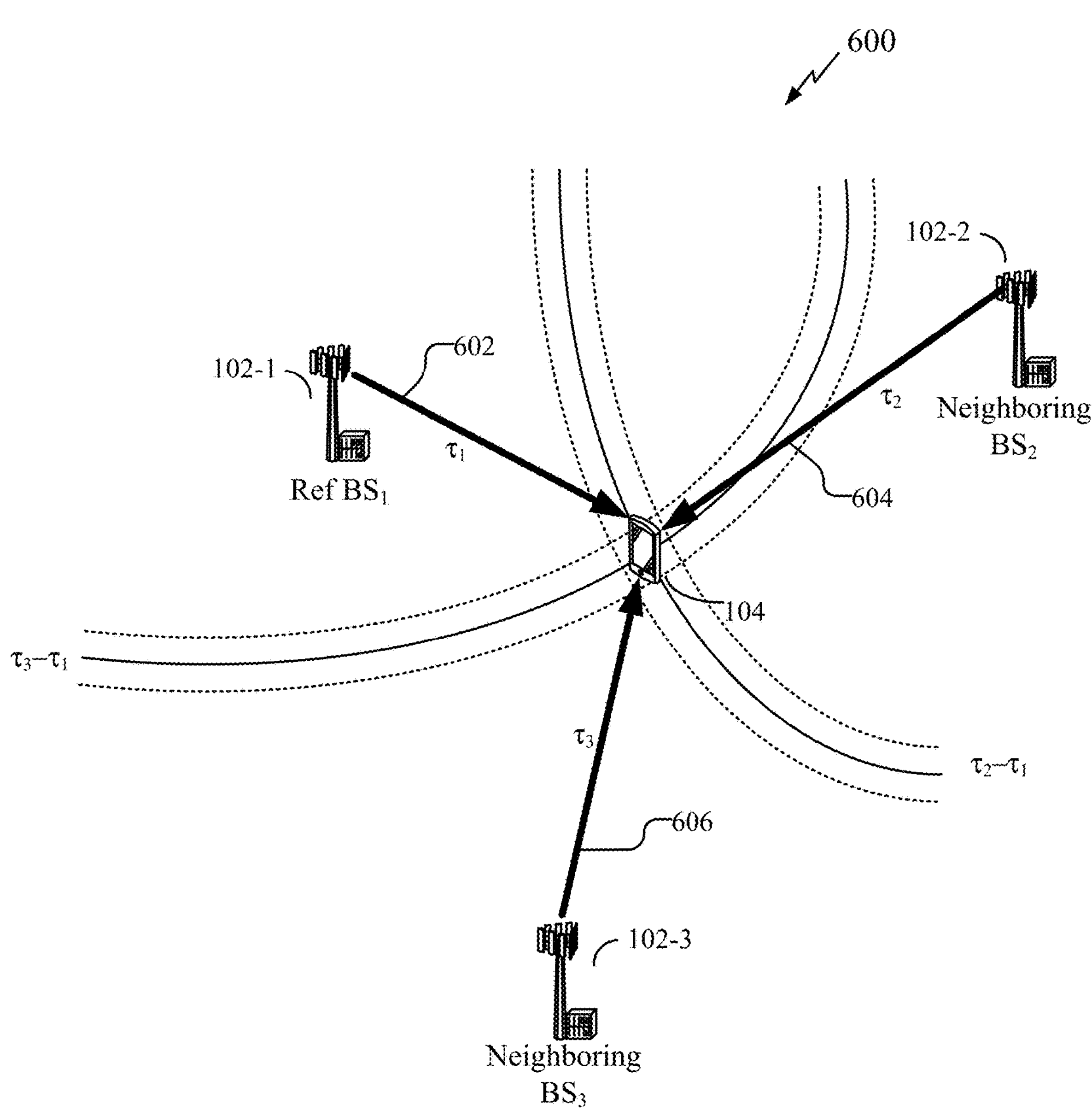
FIG. 6 illustrates an example of conventional downlink (DL) time difference of arrival (TDoA) based positioning.

FIG. 6 illustrates an exemplary wireless communications system 600 illustrating the implementation of positioning using a downlink Time Difference of Arrival (TDOA) technique. In the example of FIG. 6, a UE 104 determines an estimate of its position, or assists another entity (e.g., a base station or core network component, another UE, a location server, a third party application, etc.) to determine an estimate of its position. The UE 104 may communicate wirelessly with a plurality of base stations 102-1, 102-2, and 102-3 (collectively, base stations 102), which may correspond to any combination of base stations 102, 180 in FIG. 1A, using RF signals and standardized protocols for the modulation of the RF signals and the exchange of information packets. By extracting different types of information from the exchanged RF signals, and utilizing the layout of the wireless communications system 600 (i.e., the base station's locations, geometry, etc.), the UE 104 may determine its position, or assist in the determination of its position, in a predefined reference coordinate system. In an aspect, the UE 104 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 104 and three base stations 102, as will be appreciated, there may be more UEs 104 and more or fewer base stations 102.

To support position estimates, the base stations 102 may be configured to broadcast reference RF signals (e.g., PRS, CRS, CSI-RS, synchronization signals, etc.) to UEs 104 in their coverage area to enable a UE 104 to measure characteristics of such reference RF signals. For example, FIG. 6 illustrates base station 102-1 transmitting a downlink reference signal (PRS) 602 to the UE 104, and base stations 102-2 and 102-3 transmit downlink reference signals (PRS) 604 and 606, respectively to the UE. The UE 104 may use the DL-TDOA (e.g., OTDOA) positioning method, which is a multilateration method in which the UE conventionally measures the time of arrival (TOA) of the reference RF signals (e.g., PRS, CRS, CSI-RS, etc.) transmitted by different pairs of network nodes (e.g., base stations 102, antennas of base stations 102, etc.). Transmission and/or reception beamforming at the base stations and/or UE 104 can enable wideband bandwidth for increased precision. The TOA from several neighbor base stations may be subtracted from a TOA from a reference base station to determine the RSTDs for the base station pairs.

Generally, RSTDs are measured between a reference network node and one or more neighbor network nodes. In the example illustrated in FIG. 6, base station 102-1 may be the serving base station for UE 104 and may further serve as the reference base station, while base stations 102-2 and 102-3 serve as neighboring base stations. The reference network node remains the same for all RSTDs measured by the UE 104 for any single positioning use of OTDOA and would typically correspond to the serving cell for the UE 104 or another nearby cell with good signal strength at the UE 104. In an aspect, where a measured network node is a cell supported by a base station, the neighbor network nodes would normally be cells supported by base stations different from the base station for the reference cell and may have good or poor signal strength at the UE 104. The RSTD is conventionally the relative timing difference between two cells, e.g., the reference cell and the neighboring cell, which is determined based on the smallest time difference between two subframe boundaries from the two different cells.

The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server 172 shown in FIG. 1A (e.g., LMF 270 shown in FIG. 2B) may provide OTDOA assistance data to the UE 104 for the reference network node (e.g., base station 102-1 in the example of FIG. 6) and the neighbor network nodes (e.g., base stations 102-2 and 102-3 in the example of FIG. 6) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 104 as the reference network node.

In an aspect, while the location server 172 (e.g., LMF 270) may send the assistance data to the UE 104, alternatively, the assistance data can originate directly from the network nodes (e.g., base stations 102) themselves (e.g., in periodically broadcasted overhead messages, etc.). Alternatively, the UE 104 can detect neighbor network nodes itself without the use of assistance data.

In the example of FIG. 6, the measured time differences between the reference cell of base station 102-1 and the neighboring cells of base stations 102-2 and 102-3 are represented as $\tau 2-\tau 1$ and $\tau 3-\tau 1$, where $\tau 1$, $\tau 2$, and $\tau 3$ represent the reception time of a reference RF signal from the transmitting antenna(s) of base station 102-1, 102-2, and 102-3, respectively, by the UE 104, and includes any measurement noise at the UE 104. The UE 104 may then convert the ToA measurements for different network nodes to RSTD measurements (e.g., as defined in 3GPP TS 36.214 entitled "Physical layer; Measurements") and (optionally) send them to the location server 172. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 104 position may be determined (either by the UE 104 or the location server 172 (e.g., LMF 270)).

The ToA $T_i$ at the UE 104 for the shortest path from base station i is $$T_i = \tau_i + \frac{D_i}{c},$$

where $D_i$ is the Euclidean distance between the base stations i with location ($q_i$) and the UE 104 with location (p), c is the speed of light in the air (299700 km/s), and $q_i$ is known through the cell information database. The Euclidean distance (i.e., the line distance between two points) is given by:

$$c(T_i - \tau_i) = \sqrt{2}\, R\sqrt{1 - \sin(\varphi_1)\sin(\varphi_2) - \cos(\varphi_1)\cos(\varphi_2)\cos(\beta_1 - \beta_2)}, \quad \text{eq. 1}$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 104 first jointly processes all the resource elements (REs) on the channel on which that network node (e.g., base station 102) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 104 may choose a ToA estimate that is the earliest local maximum of the CER that is at least X dB higher than the median of the CER and a maximum Y dB lower than the main peak on the channel. The UE 104 determines the CER for each reference RF signal from each network node in order to determine the ToA of each reference RF signal from the different network nodes.

The TOA measurements performed by the UE 104 are related to the geometric distance between the UE and the base stations 102. In a 2-D Cartesian coordinate system, the (known) coordinates of a base station may be denoted as $x_i=[x_i,y_i]^T$ and the (unknown) coordinates of the UE 104 may be denoted as $x_t=[x_t, y_t]^T$. The RSTD measurements may be defined as the time difference between two base stations (modulo 1-subframe (1-ms)), and therefore, correspond to the range differences between a neighbor base station 102-*i* and the reference base station 102-1.

$$RSTD_{i,1} = \frac{\sqrt{(x_t - x_i)^2 + (y_t - y_i)^2}}{c} - \quad \text{eq. 2}$$

-continued $$\frac{\sqrt{(x_t - x_1)^2 + (y_t - y_1)^2}}{c} + (T_j - T_1) + (n_i - n_1)$$

In equation 2, $RSTD_{i,1}$ is the time difference between the neighboring base station 102-*i* and reference base station 102-1 measured at the UE 104, ($T_i$-$T_1$) is the transmit time offset between the base stations, referred to as a "Real Time Differences" (RTDs); $n_i$ and $n_1$ are the UE TOA measurement errors, and c is the speed of light.

At least two neighbor base station measurements i are needed, but more than two neighbor base station measurements are desirable, and the system of equations may be solved in the least-squares, or weighted-least-squares sense. The transmit time offsets (Ti-T1) should (ideally) be zero in a synchronized network, and the equation above defines the time-difference-of-arrival (TDOA). Geometrically, each TDOA defines a hyperbola, where the width of the hyperbola is determined by the TDOA errors (ni-n1) as shown in FIG. 6. If the coordinates of the base stations 102 and the transmit time offsets (Ti-T1) are known at the location server 172 (e.g., LMF 270) or at the UE 104, the position of the UE 104 may be determined. Uncertainty in the base station 102 coordinates or transmit time offsets will directly impact the accuracy of the UE location estimate. An additional source of delay or error is due to UE and gNB hardware group delay, which is primarily due to internal hardware delays between a baseband (BB) component and antenna (ANT) at the UE and gNB. Hardware group delays can contribute to timing errors and/or calibration errors that can impact positioning measurements, which in turn can impact positioning performance.

Thus, for conventional OTDOA measurements, very accurate and reliable network synchronization is important for accuracy. At the speed of light, each nsec of error in timing translates into about a foot (~0.3 m) of error in position. As inter-base station synchronization degrades, the OTDOA measurements become less accurate, e.g., the hyperbolas shown in FIG. 6 and the position error increases proportionally. The synchronization requirements for OTDOA, however, are much more stringent compared to the synchronization requirements for communication purposes.

Uplink Time Difference of Arrival (UTDOA) is a similar positioning method to OTDOA, but is based on uplink reference RF signals, e.g., UL PRS or SRS transmitted by the UE (e.g., UE 104). Further, transmission and/or reception beamforming at the network node and/or UE 104 can enable wideband bandwidth at the cell edge for increased precision. Beam refinements may also leverage channel reciprocity procedures in 5G NR. As with OTDOA, a lack of synchronization during UTDOA positioning results in a degradation of accuracy.

Figure 7:
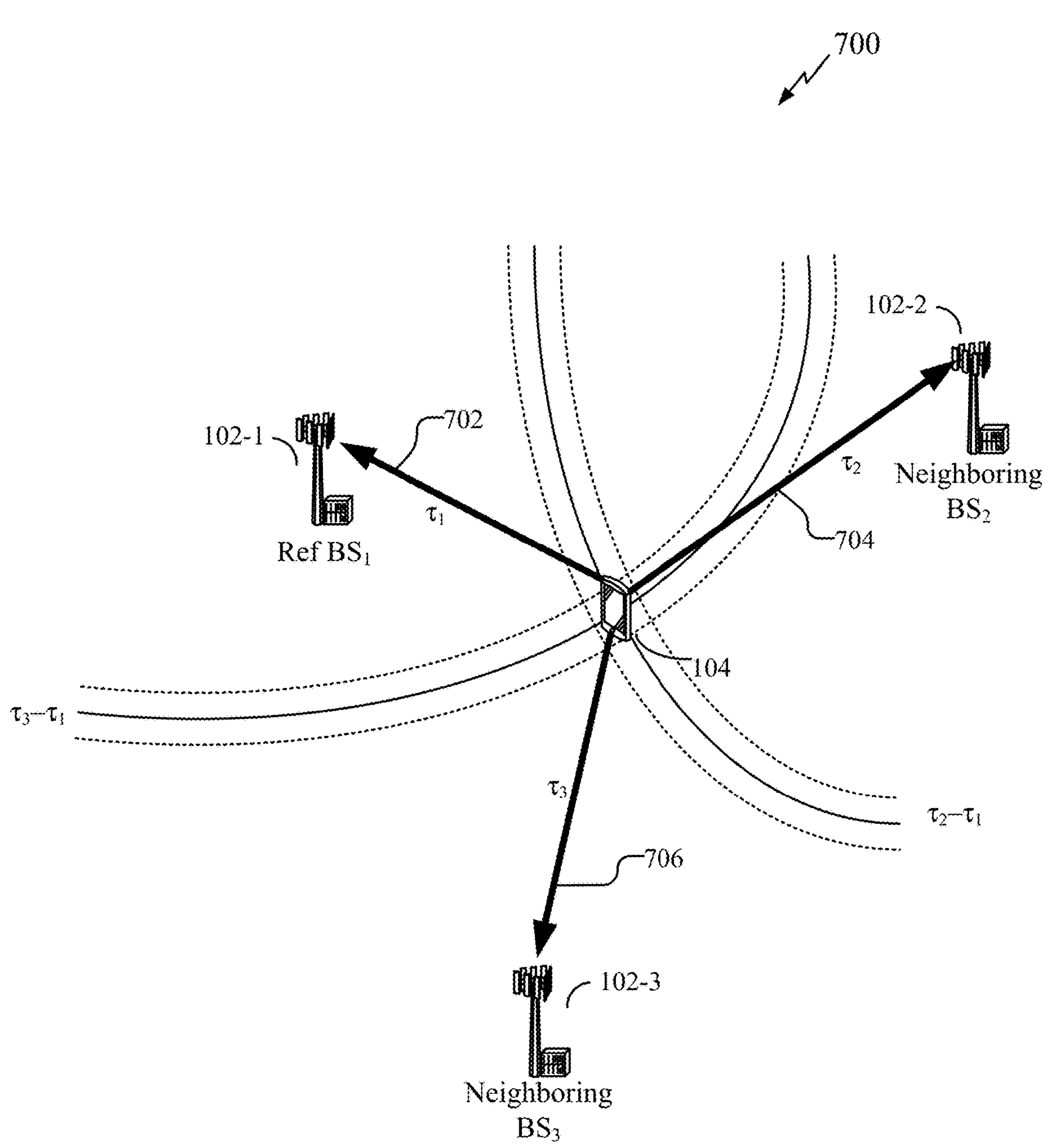
FIG. 7 illustrates an example of conventional uplink (UL) TDoA based positioning.

FIG. 7 illustrates an exemplary wireless communications system 700 illustrating the implementation of positioning using an uplink Time Difference of Arrival (TDOA) technique. FIG. 7 is similar to FIG. 6 discussed above but illustrates UTDOA, as opposed to OTDOA. As illustrated, the UE 104 transmits SRS 702 to the reference base station 102-1, and at the same time transmits SRS 704 and 706 to the neighboring base stations 102-2 and 102-3, respectively. In some implementations, the SRS 702, SRS 704, and SRS 706 may be the same transmission. In other implementations, SRS 702, SRS 704, and SRS 706 may be separate transmissions, where the UE 104 measures and stores the time between transmissions of SRS 702 and SRS 704 and between transmissions of SRS 702 and SRS 706.

Assuming the base stations 102 are synchronized, the RSTD for SRS 702 and 704 may then be determined based on the difference between the time of reception at base stations 102-1 and 102-2 of the SRS 702 and SRS 704, respectively, minus any delay between transmission of SRS 702 and 704 (if any) at the UE 104. Similarly, the RSTD for SRS 702 and 706 may be determined based on the difference between the time of reception at base stations 102-1 and 102-3 of the SRS 702 and SRS 706, respectively, minus any delay between transmission of SRS 702 and 706 (if any) at the UE 104. The position of the UE 104 may thus be determined based on the intersection of the resulting hyperbolas, similar to the discussion above.

While positioning techniques, such as DL TDOA and UL TDOA illustrated in FIGS. 6 and 7 relate generally to measurement procedures between a target UE and multiple base stations, in some designs, a reference device associated with a known location may participate in one or more positioning procedures. For example, sidelink positioning, e.g., using another UE or other device having a known position, that may communicate with the target UE 104 via sidelink communications, may be used in measurement procedures in place of one or more base stations. The use of sidelink for positioning may be desirable as it permits a more flexible deployment with UE-form anchor devices, e.g., in environments where satellite based positioning, such as Global Navigation Satellite System (GNSS), or network positioning is compromised. For example, in indoor environments, e.g. shopping mall, manufacturing plant, etc. or in urban canyons GNSS or network signal reception for positioning may be poor, or there may be multipath components, interference, etc., that renders positioning difficult. Additionally, sidelink positioning may operate independent of network coverage, and thus, may have lower latency as it does not require the establishment of a network connection prior to positioning. Sidelink positioning also allows relative positioning, which does not require absolution position calculations. Relative positioning using sidelink, for example, may be useful, in public safety operations (e.g., tracking emergency personnel), vehicle applications (e.g., platooning, collision avoidance), unmanned aerial vehicle (UAV) applications (e.g., approaching a docking station or landing), augmented reality (AR) applications (e.g., user interaction within AR), smart home entertainment applications (e.g., connecting and interacting between devices), etc.

Reference devices, such as UEs with a recent positioning fix, roadside units (RSUs), etc., may be configured to support downlink related positioning, such as DL-TDOA, uplink related positioning, such as UL-TDOA, or a combination of downlink and uplink related positioning, such as RTT. The reference devices may be configured to support measurement of DL-PRS (or sidelink (SL-PRS)) and report associated measurements (e.g., RSTD, RxTx time difference, RSRP) to the LMF (or to UE for UE-based positioning), transmit UL-PRS (or SL-PRS) and report associated measurements (e.g., Tx time, RxTx time difference, etc.). A reference device may sometimes be referred to herein as an anchor device for positioning. Additionally, base stations may sometimes be referred to as a (stationary) anchor devices for positioning as well.

Figure 8:
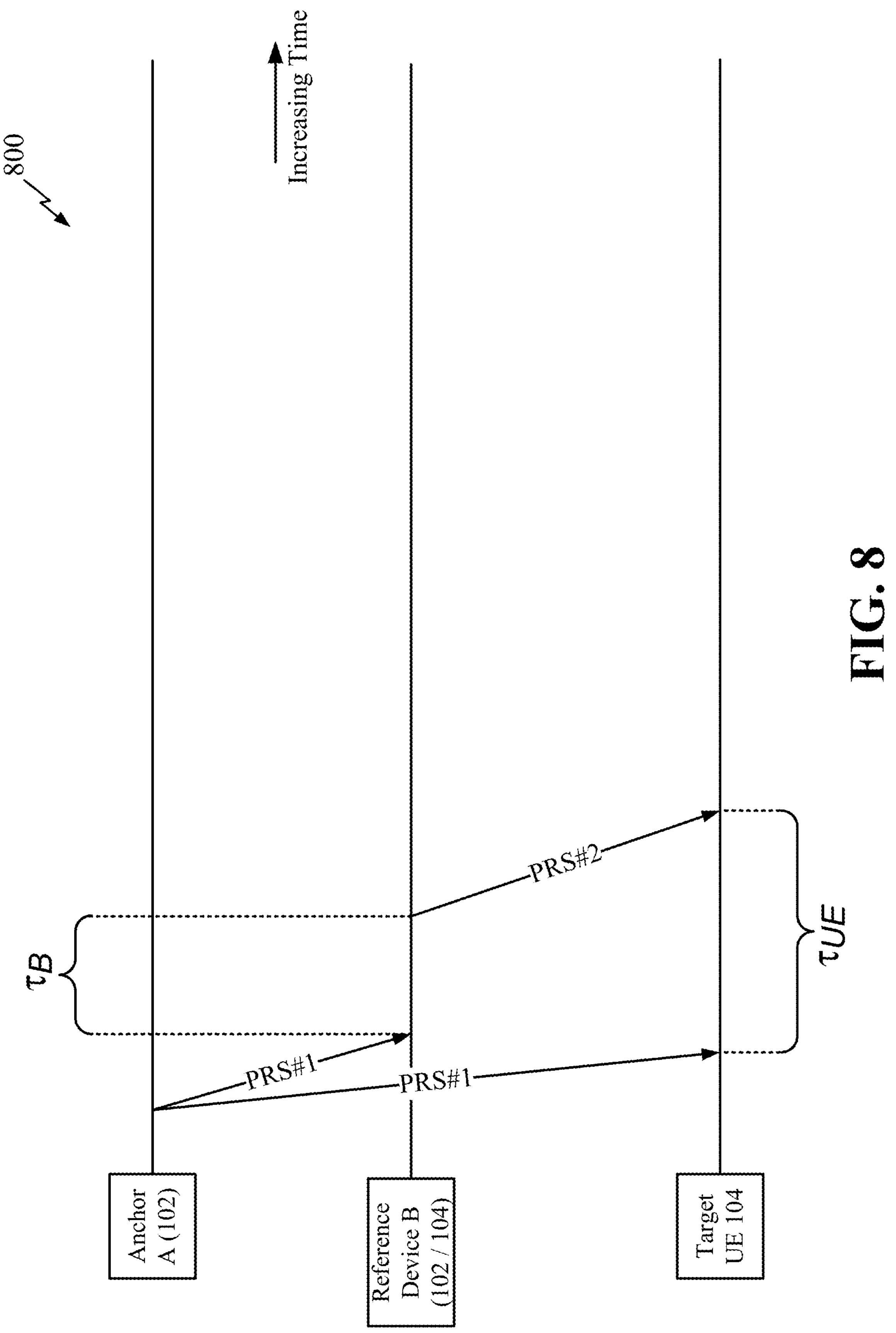
FIG. 8 illustrates a timing diagram of TDOA measurement signals exchanged between a UE and stationary anchors.

FIG. 8, by way of example, illustrates a timing diagram 800 of TDOA measurement signals exchanged between the target UE 104 and stationary anchors, such as BS A (e.g., base station 102), a reference device B (e.g., such as a UE 104 with known location or another base station 102). The BS A and reference device B, in this example, are stationary and have known positions. The timing diagram 800 of FIG. 8 illustrates the difference between the time of reception Rx of PRS #1 and time of transmission of PRS #2 by the reference device B (T_RxTx) is denoted as $\tau_B$, and the difference between the time of reception Rx of PRS #1 and time of reception of PRS #2 at the target UE 104 (T_Rx-Rx) is denoted as $\tau_{UE}$, and $\hat{\tau}_B$ and $\hat{\tau}_{UE}$ as used herein represent the measured values.

TDOA-based positioning relies heavily on network synchronization (among gNBs) for positioning accuracy. By introducing a reference device (denoted below as reference device B) with a known stationary location (either a UE or a gNB), the requirement on gNB synchronization can be relaxed by taking the anchor-to-anchor time measurement $T_{oF}$ (A, B) (Rx-Tx time difference) into the calculation of RSTD ($T_{RSTD}=T_{oF}$ (B,UE)$-T_{oF}$ (A, UE)), whereby $$\tau_{UE} = [T_{oF}(A,B) - T_{oF}(A,UE)] + \tau_B + T_{oF}(B,UE), \Rightarrow T_{RSTD} = T_{oF}(B,UE) - T_{oF}(A,UE) = \hat{\tau}_{UE} - \hat{\tau}_B - T_{oF}(A,B) \quad \text{eq. 3}$$

where $T_{oF}$ (Time of Flight) is the propagation time between two nodes, and $T_{oF}$ (A, B) between BS A and reference device B can be obtained from almanac information (e.g., since the locations of BS A and reference device B are known, the propagation delay between BS A and reference device B can be calculated rather than measured).

Assuming a constant clock-drift during a short period $\tau$, the measured $\hat{\tau}=(1+e)\tau$, where e is the clock-drift which can be ±0.1 ppm for both UE and gNB. Error depends mainly on $\hat{\tau}_{UE}-\hat{\tau}_B$, e.g.:

$$\begin{aligned}(\hat{\tau}_{UE} - \hat{\tau}_B) - (\tau_{UE} - \tau_B) = \\ e_{UE}\tau_{UE} - e_B\tau_B = e_{UE}[T_{oF}(A,B) - T_{oF}(A,UE) + \tau_B + T_{oF}(B,UE)] - \\ e_B\tau_B = [T_{oF}(A,B) + T_{oF}(B,UE) - T_{oF}(A,UE)]e_{UE} + \tau_B(e_{UE} - e_B)\end{aligned} \quad \text{eq. 4}$$

where $\tau_B$ ($e_{UE}$-$e_B$) is the dominant part of the error, and ($e_{UE}$-$e_B$) can be ±0.2 ppm.

In some systems, this level of error may be unacceptable. For example, in some designs, the mean value of basic measurements of UE modulated carrier frequency may be required to be accurate to within ±0.1 PPM observed over a period of 1 ms of cumulated measurement intervals compared to the carrier frequency received from the NR Node B.

In some designs, error due to time-drift mainly depends on PRS #1-to-PRS #2 gap ($\tau_B$). For the accuracy requirements increase in 3GPP Rel-17 (e.g., 1 m for general commercial use, or 20 cm for IIOT), assuming a 10% error budget, for the accumulated ±0.2 ppm, the required maximum PRS #1-to-PRS #2 gap can be 1.67 msec and 0.33 msec respectively, e.g.:

$$\frac{20\ \text{cm} * 10\%}{0.2\ \text{ppm} * c} = 0.33\ \text{msec} \quad \text{eq. 5}$$

Figure 9:
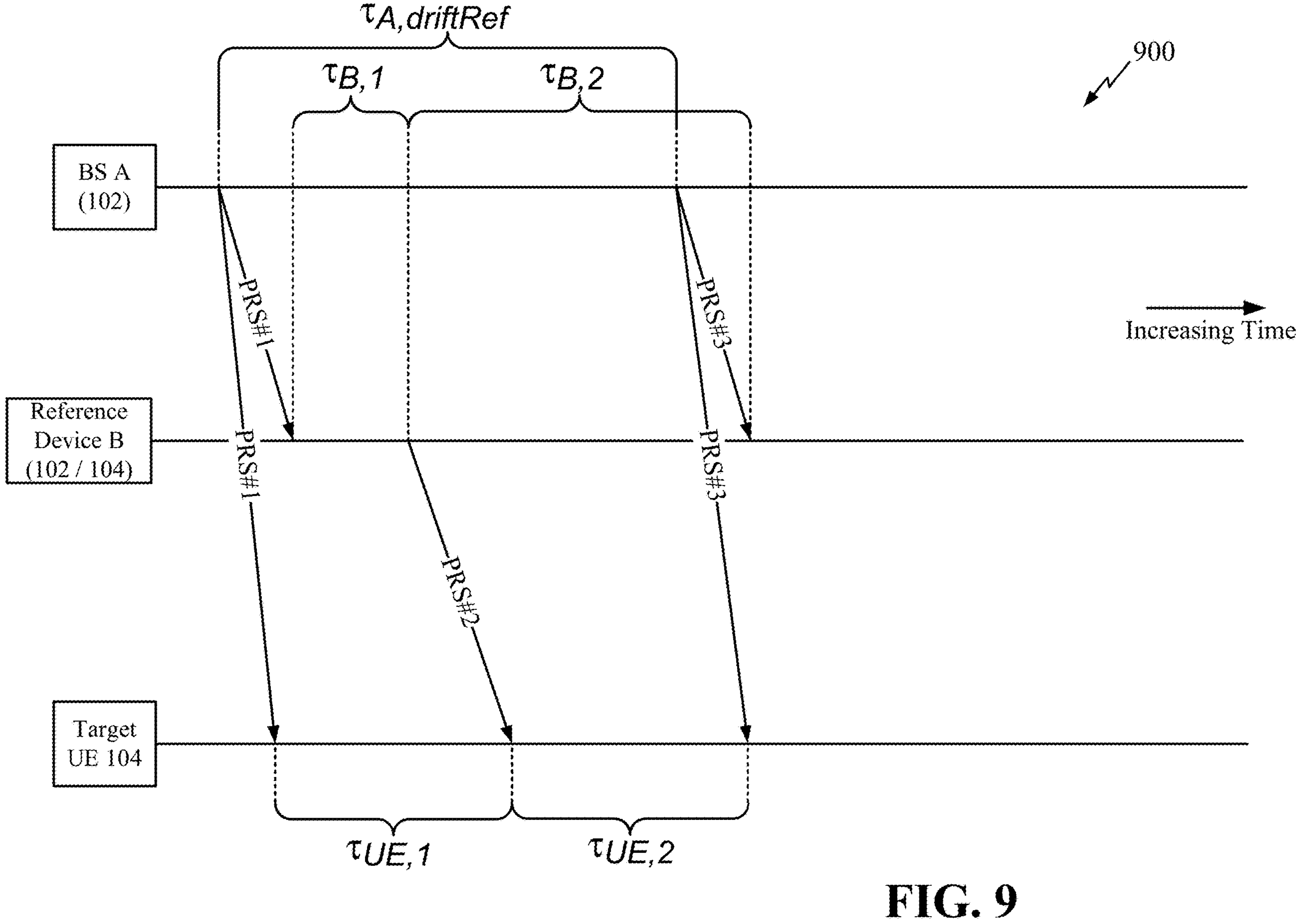
FIG. 9 illustrates a timing diagram of TDOA measurement signals exchanged between a UE and stationary anchors with improved accuracy.

FIG. 9 illustrates an exemplary process 900 for TDOA procedures that improves positioning accuracy for position estimation of the target UE 104 using time drift mitigation. In FIG. 9, similar to FIG. 8, the measurement signals are exchanged between BS A (e.g., base station 102), a reference device B (e.g., such as a UE 104 with known location or another base station 102) and target UE 104. The BS A and reference device B, in this example, are stationary and have known positions.

For context, a baseline DL-TDOA algorithm is $T_{RSTD}=T_{oF}(B, UE)-T_{oF}(A, UE)=\hat{\tau}_{UE,1}-\hat{\tau}_{B,1}-T_{oF}(A, B)$, with an associated error of $[T_{oF}(A, B)+T_{oF}(B, UE)-T_{oF}(A, UE)]e_{UE}+\tau_{B,1}(e_{UE}-e_B)$. However, this baseline DL-TDOA algorithm can be compensated for time drift, e.g.:

$$T_{RSTD} = T_{oF}(B, UE) - T_{oF}(A, UE) = \frac{\tau_{A,driftRef}}{\hat{\tau}_{UE,1}+\hat{\tau}_{UE,2}}\hat{\tau}_{UE,1} - \frac{\tau_{A,driftRef}}{\hat{\tau}_{B,1}+\hat{\tau}_{B,2}}\hat{\tau}_{B,1} - T_{oF}(A, B), \quad \text{eq. 6}$$

where $T_{oF}(A, B)$ can be obtained from almanac information (e.g., since the locations of BS A and reference device B are known, the propagation delay between BS A and reference device B can be calculated rather than measured). In this case, the error may be $e_A[T_{oF}(A, B)+T_{oF}(B, UE)-T_{oF}(A, UE)]$, which is lower than the error of the baseline DL-TDOA algorithm as noted above in equation 4. In order to be effective, the drift-correction reference duration $\hat{\tau}_{driftRef}$ must be long to be effective, otherwise the multiplicative correction factor, e.g., $$\frac{\hat{\tau}_{A,driftRef}}{\hat{\tau}_{UE,1}+\hat{\tau}_{UE,2}},$$

will be a constant 1.

In an example, paired RSTDs may be measured by the target UE 104, which is associated with paired PRS from the BS A (PRS #1 and #3), and another PRS from reference device B (PRS #2), e.g. to obtain $\hat{\tau}_{UE,1}$ and $\hat{\tau}_{UE,2}$. For UE-assisted positioning, the measured RSTDs are reported to LMF. An alternative option is to report a ratio associated with $$\frac{\hat{\tau}_{UE,1}}{\hat{\tau}_{UE,1}+\hat{\tau}_{UE,2}}.$$

In some designs, paired RxTx time differences measured by the reference device B, which is associated with paired PRS from the BS A (PRS #1 and #3)—e.g. to obtain $\hat{\tau}_{B,1}$ and $\hat{\tau}_{B,2}$. For UE-assisted positioning, the paired RxTx time differences are reported to LMF. For UE-based positioning, the paired RxTx time differences are reported to UE. An alternative option is to report a ratio associated with $$\frac{\hat{\tau}_{B,1}}{\hat{\tau}_{B,1}+\hat{\tau}_{B,2}}.$$

The use of reference devices, such as reference device B in FIGS. 8 and 9, is premised on the reference devices being stationary. Stationary reference devices, however, may not be available in all environments. For example, in some environments, there may be reference devices with known positions that are available for positioning, but the reference devices may be mobile. By way of example, mobile reference devices with known positions may be vehicle UEs.

For example, in a Vehicle-to-Everything (V2X) wireless system, a moving vehicle UE may be utilized as multiple reference devices (anchors) over time for positioning a relatively stationary target UE, e.g., a UE held by a pedestrian.

Figure 10:
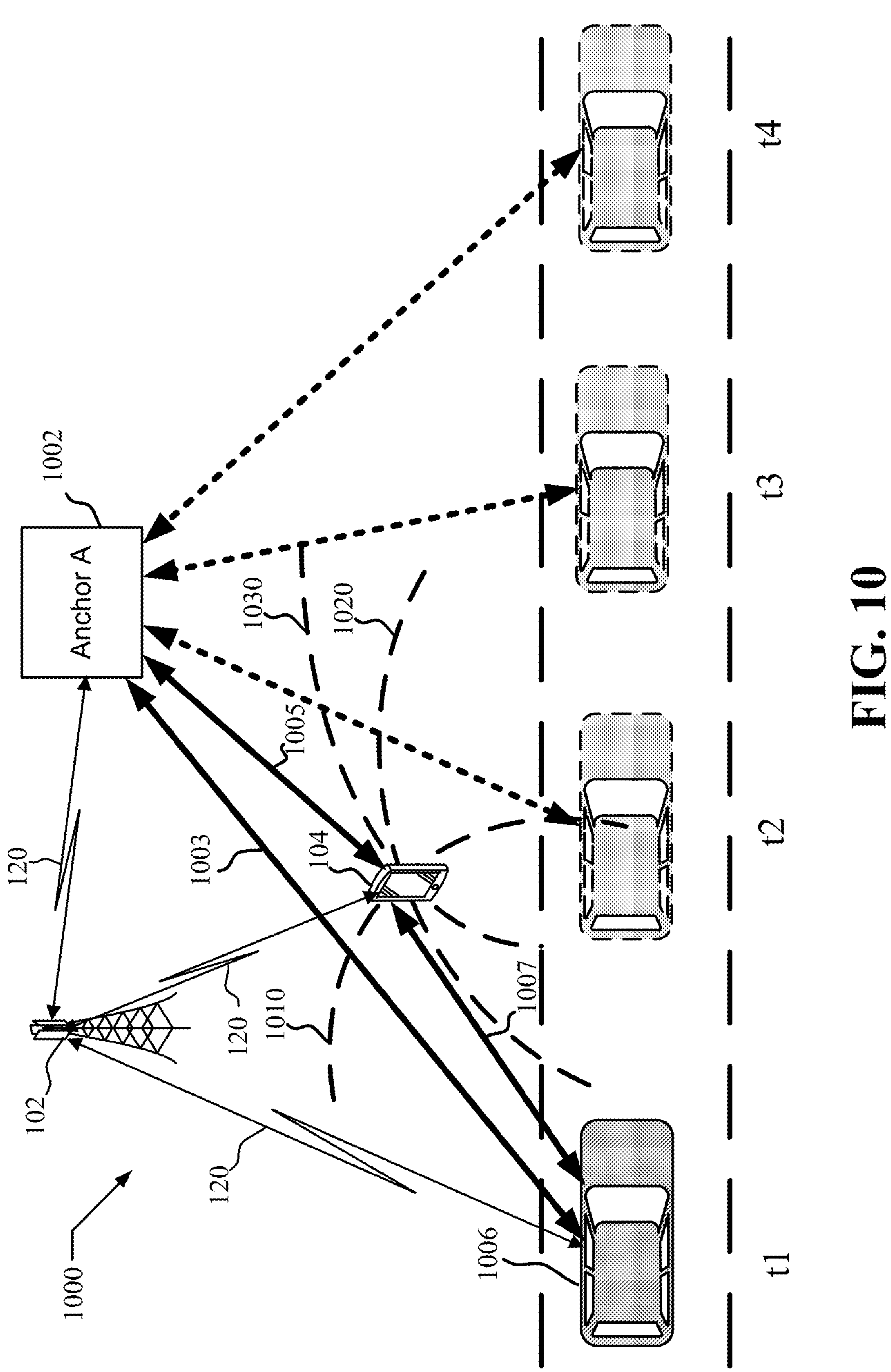
FIG. 10 illustrates a wireless communication system that includes a moving anchor that may be used in TDOA measurements.

FIG. 10, for example, illustrates a wireless communication system 1000 illustrating Vehicle-to-Everything (V2X) communications used for positioning of a target UE 104 using a downlink Time Difference of Arrival (TDOA) technique with a fixed (stationary) anchor 1002 and a moving anchor 1006. It should be understood that FIG. 10 illustrates a single moving anchor 1006 at multiple times (t1, t2, t3, and t4) showing the change in position of the moving anchor 1006 with respect to the target UE 104 over time. The moving anchor 1006 for example, is illustrated at times t2, t3, and t4 with dotted lines and lighter coloring than shown at time t1.

In some implementations, the wireless communication system 1000 may be a Cellular V2X (C-V2X) system. In general, there are two modes of operation for V2X services, as defined in Third Generation Partnership Project (3GPP) TS 23.285. One mode of operation uses direct wireless communications between V2X entities, e.g., the target UE 104, fixed anchor 1002, and moving anchor 1006. The other mode of operation uses network based wireless communication between entities. The two modes of operation may be combined, or other modes of operation may be used if desired.

As illustrated in FIG. 10, the wireless communication system 100 may operate using direct or indirect wireless communications between the target UE 104 and the fixed anchor 1002 and moving anchor 1006. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHZ, or other wireless connections directly between entities. The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as ADAS, which helps drivers with critical decisions, such as lane changes, speed changes, overtaking speeds, and may be used to assist in parking as discussed herein. Low latency communications are used in V2X and, are therefore suitable for precise relative positioning, e.g., using RTT, TDOA, etc.

In some implementations, the fixed anchor 1002 may be a roadside unit (RSU) in the V2X system. An RSU, for example, supports V2X applications and can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The fixed anchor 1002, if it is an RSU, along with one or more of the UE 104 and moving anchor 1006, may communicate with a base station 102 via communication channels 120. In some implementations, the fixed anchor 1002 may be a base station 102 or another UE 104 that is stationary and has a known location.

As illustrated, the target UE 104, fixed anchor 1002, and moving anchor 1006 may directly communicate and transmit positioning signals, e.g., DL PRS, UL PRS (SRS for positioning) or SL PRS, which may be used for positioning. For example, the target UE 104 and fixed anchor 1002 may directly communicate and transmit positioning signals using with a communication link 1005, the target UE 104 and moving anchor 1006 may directly communicate and transmit positioning signals using a communication link 1007, and the fixed anchor 1002 and moving anchor 1006 may directly communicate and transmit positioning signals using a communication link 1003. The PRS broadcast by the target UE 104, fixed anchor 1002, and moving anchor 1006 may be any signal suitable for positioning, e.g., as defined for DSRC or C-V2X. The PRS may be broadcast on licensed or unlicensed spectrum. For example, in some implementations, PRS may be broadcast on one or more Unlicensed National Information Infrastructure (UNII) radio bands including, for example, one or more of the UNII-1 radio band, the UNII-2A radio band, the UNII-2B radio band, or the UNII-3 radio band. When broadcast on unlicensed spectrum, listen before transmit (LBT) protocols may be employed.

The moving anchor 1006 may be a vehicle UE (or other moving entity) that has an accurate position over the period of time during which TDOA measurements are made. For example, at a first time (t1) during the TDOA positioning of the target UE 104 the moving anchor 1006 may have an accurate position, e.g., due to GNSS or terrestrial positioning techniques. At subsequent times during the TDOA positioning of the target UE 104, e.g., at times t2, t3, and t4, the moving anchor 1006 may have a known position, e.g., due to dead reckoning based on the initial position at time t1 and mobility information (including velocity, yaw/pitch/roll, acceleration, etc.) provided by on-board sensors of the vehicle, such as accelerometers, gyroscopes, wheel tick sensors, etc. Additionally or alternatively, an updated position of the moving anchor 1006 at subsequent times may be obtained using, e.g., GNSS or terrestrial positioning techniques.

For a moving anchor, the TDOA algorithm to compensate for drift, illustrated in FIG. 9 and equation 6, cannot be extended in a straightforward manner. For example, as discussed, in order to be effective, the drift-correction reference duration $\hat{\tau}_{driftRef}$ shown in FIG. 9, must be long to be effective, otherwise the multiplicative correction factor, e.g., $$\frac{\hat{\tau}_{A,driftRef}}{\hat{\tau}_{UE,1}+\hat{\tau}_{UE,2}},$$

will be a constant 1. If the reference device B in FIG. 9 is moving, during the long period between transmission of PRS #1 and PRS #3 by BS A, the reference device B would move away from its initial position. For example, for a vehicle with 30 m/s velocity, a drift-correction reference duration of 200 ms between PRS #1 and PRS #3 would result in reference device B traveling 6 m from its initial location.

Accordingly, if reference device B in FIG. 9 is moving, e.g., reference device B is moving anchor 1006 shown in FIG. 10, the reference device B may be treated as two virtual anchors at different locations, e.g., separated by 6 m distance in the above example. Due to the change in position of the moving anchor, the time drift mitigation illustrated in FIG. 9 may be modified.

Figure 11:
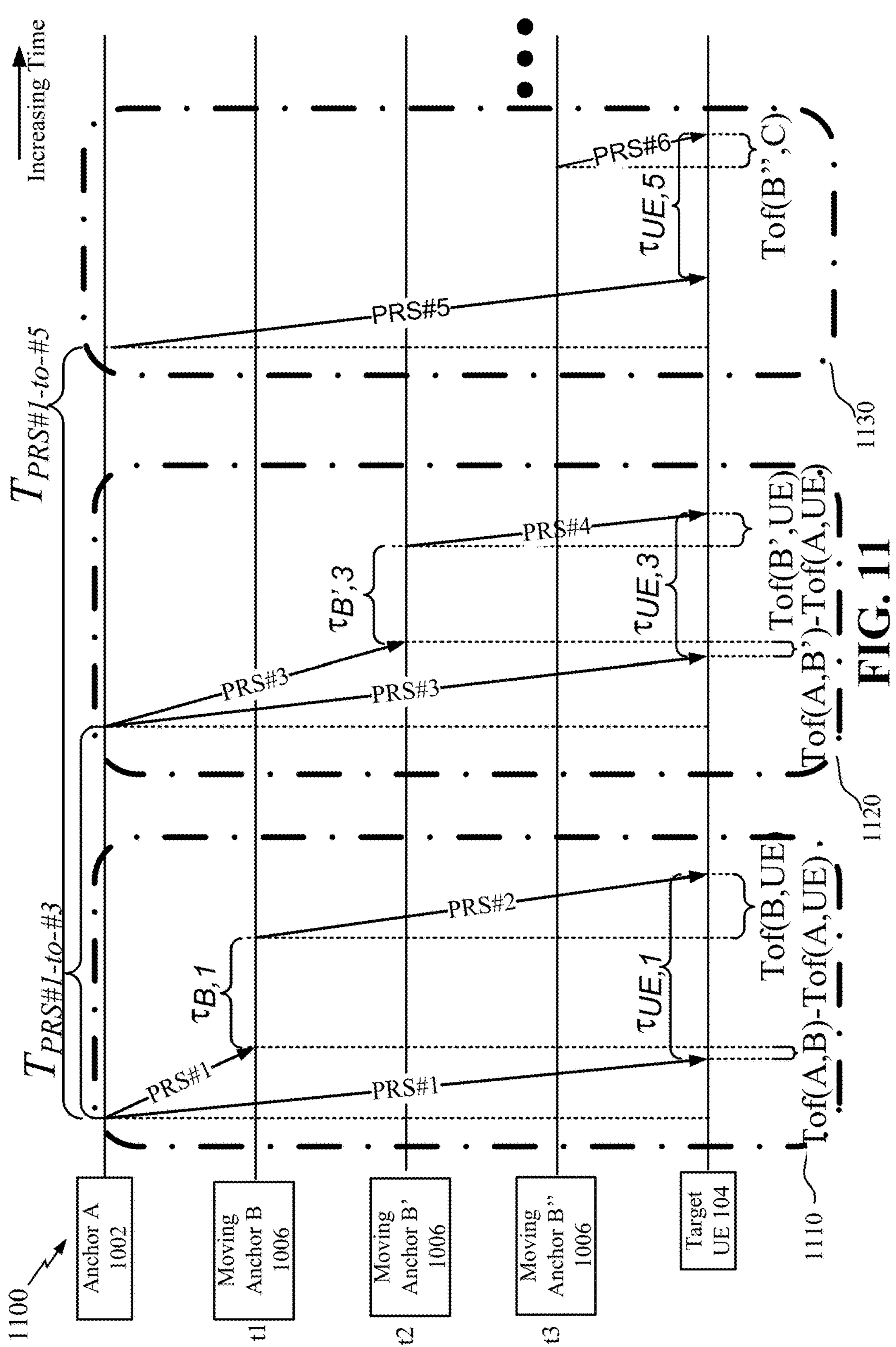
FIG. 11 illustrates a timing diagram of TDOA measurement signals exchanged between a UE and a stationary and moving anchor with improved accuracy.

FIG. 11, by way of example, illustrates an exemplary process 1100 for TDOA procedures that improves positioning accuracy for position estimation of the target UE 104 using time drift mitigation for a moving anchor.

In FIG. 11, the measurement signals are exchanged between anchor A 1002, which may be an RSU, another UE with known location, a base station 102, etc., moving anchor B 1006, which may be a vehicle UE or other mobile UE, and a target UE 104. In FIG. 11, anchor A 1002 and target UE 104 are relatively stationary, and moving anchor B 1006 is moving and is thus treated as a number of virtual anchors. FIG. 11, for example, illustrates the same moving anchor B 1006 as three virtual anchors (i.e., moving anchor B 1006, moving anchor B' 1006, and moving anchor B" 1006), which are at different relative positions with respect to target UE 104 over time, illustrated as separate timelines t1, t2, and t3, respectively. The timelines t1, t2, and t3, for example, may correspond with the times t1, t2, and t3, shown in FIG. 10. Moreover, the set of RSTDs produced by the signaling exchange for the TDOA procedure in FIG. 11 is illustrated as three RSTD measurement instances 1110, 1120, and 1130, identified with dash-dot boxes, each of which is associated with the moving anchor B 1106 at corresponding times t1, t2, and t3. It should be understood that while three RSTD measurement instances 1110, 1120, and 1130 are illustrated in the set of RSTDs in FIG. 11, if desired, additional RSTD measurement instances may be included in the set of RSTDs, e.g., corresponding to time t4 (and additional times) illustrated in FIG. 10. The TDOAs determined based on RSTD measurement instances 1110, 1120, and 1130 from times t1, t2, and t3, define hyperbolas 1010, 1020, and 1030 illustrated in FIG. 10, which intersect at the location of the target UE 104. Accordingly, using the known location of the anchor A 1002 and the known location of the moving anchor B 1006 at each of times t1, t2, and t3, the position of the target UE 104 may be determined.

As illustrated by the RSTD set shown in FIG. 11, the fixed anchor A 1002 transmits reference signals (PRS) for a plurality of RSTD measurement instances (e.g., PRS #1, PRS #3, and PRS #5 transmitted in respective RSTD measurement instances 1110, 1120, and 1130), and the moving anchor B 1006 transmits corresponding reference signals (PRS) in the plurality of RSTD measurement instances (e.g., PRS #2, PRS #4, and PRS #6 transmitted in RSTD measurement instances 1110, 1120, and 1130).

In RSTD measurement instance 1110, anchor A 1002 transmits PRS #1, which is received by moving anchor B 1006 (in time t1) and by target UE 104. In response to receiving PRS #1, after a period $\tau_{B,1}$, the moving anchor B 1006 transmits PRS #2, which is received by target UE 104. In RSTD measurement instance 1120, after a drift-correction reference duration T_PRS #1-to-#3, the anchor A 1002 transmits PRS #3, which is received by moving anchor B' 1006 (in time t2) and by target UE 104. In response to receiving PRS #3, after a period $\tau_{B,3}$, the moving anchor B' 1006 transmits PRS #4, which is received by target UE 104. In RSTD measurement instance 1130, after a drift-correction reference duration T_PRS #1-to-#5, the anchor A 1002 transmits PRS #5, which is received by target UE 104. Additionally, moving anchor B" 1006 (in time t3) transmits PRS #6, which is received by target UE 104. It should be noted that in RSTD measurement instance 1130, moving anchor B" 1006 does not need to receive PRS #6 or monitor the period between receiving PRS #5 from anchor UE 1002 and transmitting PRS #6 to the target UE 104.

As illustrated in respective RSTD measurement instances 1110 and 1120, the moving anchor B 1006 at time t1, and the moving anchor B' 1006 at time t2 measures the RxTx time difference between receiving a reference signal (PRS) from anchor A 1002 and transmitting a reference signal (PRS) to the target UE 104. Because these RSTD measurement instances 1110 and 1120 include the moving anchor B 1006 measuring the RxTx time difference based on receiving a reference signal from the other anchor A 1002, these RSTDs include "anchor-to-anchor" procedures. For example, in RSTD measurement instance 1110, the RxTx time difference between receiving PRS #1 and transmitting PRS #2 labeled $\tau_{B,1}$ and when measured by the moving anchor B 1006 is labeled $\hat{\tau}_{B,1}$, while in RSTD measurement instance 1120, the RxTx time difference between receiving PRS #3 and transmitting PRS #4 is labeled $\tau_{B',3}$ and when measured by the moving anchor B' 1006 is labeled $\hat{\tau}_{B',3}$.

The RxTx time differences measured in the two RSTD measurement instances may be used to determine the clock drift error that may result from non-ideal synchronization between the anchor A 1002 and the moving anchor B 1006. With the clock drift error determined using two RSTD measurement instances (e.g., RSTD measurement instances 1110 and 1120), additional RSTD measurement instances may be measured for the RSTD set (RSTD measurement instance 1130) without an anchor-to-anchor procedure, i.e., without measuring an RxTx time difference between receiving a reference signal (PRS) from anchor A 1002 and transmitting a reference signal (PRS) to the target UE 104. If desired, with the clock drift error determined, the RSTD set may include multiple RSTD measurement instances without an anchor-to-anchor procedure.

It should be understood that while FIG. 11 illustrates two adjacent RSTD measurement instances that include an anchor-to-anchor procedure (i.e., RSTD measurement instances 1110 and 1120), if desired, one or more intervening RSTD measurement instances, without an anchor-to-anchor procedure, may be present.

The clock drift error that results from non-ideal synchronization between the anchor A 1002 and the moving anchor B 1006 may be identified as follows. As can be seen in FIG. 11, $$\tau_{UE,1} = [T_{oF}(A, B) - T_{oF}(A, UE)] + \tau_{B,1} + T_{oF}(B, UE). \quad \text{eq. 7}$$

Therefore, for non-ideal anchor synchronization, a baseline DL-TDOA algorithm for RSTD measurement instance 1110 may be written as:

$$T_{RSTD} = T_{oF}(B, UE) - T_{oF}(A, UE) = \hat{\tau}_{UE,1} - \hat{\tau}_{B,1} - T_{oF}(A, B). \quad \text{eq. 8}$$

If the time gap between transmission of PRS #1 and PRS #2 (configured slot offset in msec) is designated as $T_{PRS\ \#1\text{-}to\text{-}\#2}$, then for ideal anchor synchronization, a baseline DL-TDOA algorithm may be written as:

$$T_{RSTD,ideal} = T_{oF}(B, UE) - T_{oF}(A, UE) = \hat{\tau}_{UE,1} - T_{PRS\#1-to-\#2}. \quad \text{eq. 9}$$

The synchronization bias, thus, may be determined by subtracting equations 8 and 9, resulting in:

$$\Delta_{anchorSync,1} = T_{RSTD} - T_{RSTD,ideal} = T_{PRS\#1-to-\#2} - \hat{\tau}_{B,1} - T_{oF}(A, B). \quad \text{eq. 10}$$

Similarly, for PRS #3 and PRS #4 in RSTD measurement instance 1120, the synchronization bias may be written as:

$$\Delta_{anchorSync,3} = T_{PRS\#3-to-\#4} - \hat{\tau}_{B',3} - T_{oF}(A, B'). \quad \text{eq. 11}$$

Assuming the variation of anchor synchronization bias is due solely to clock drift, (where $e_A$ is the error at anchor A 1002 and $e_B$ is the error at moving anchor B 1006), then the synchronization bias for PRS #3 and PRS #4 can be written as:

$$\Delta_{anchorSync,3} = \Delta_{anchorSync,1} + (e_B - e_A)T_{PRS\#1-to-\#3}, \quad \text{eq. 12}$$

$$(e_B - e_A) = \frac{T_{PRS\#3-to-\#4} - T_{PRS\#1-to-\#2} + \hat{\tau}_{B,1} - \hat{\tau}_{B',3} + T_{oF}(A, B) - T_{oF}(A, B')}{T_{PRS\#1-to-\#3}}. \quad \text{eq. 13}$$

Thus, as can be seen in equation 13, the clock drift error ($e_B$-$e_A$) is a function of measuring quantities, including the RxTx time difference ($\tau_{B,1}$) measured by the moving anchor B 1006 at time t1 in RSTD measurement instance 1110 and the RxTx time difference ($\tau_{B,2}$) measured by the moving anchor B' 1006 at time t2 in RSTD measurement instance 1120.

With the clock drift error ($e_B$-$e_A$) determined, additional RSTD measurement instances (e.g., RSTD measurement instance 1130) may be estimated without the anchor-to-anchor procedure. For example, under a non-ideal synchronization assumption for the anchor A 1002 and the moving anchor B" 1006, at time t3, the DL-TDOA algorithm for RSTD measurement instance 1130 may be written as:

$$T_{RSTD} = T_{oF}(B'', UE) - T_{oF}(A, UE) = \hat{\tau}_{UE,5} - T_{PRS\#5-to-\#6} + \Delta_{anchorSync,5}. \quad \text{eq. 14}$$

The $\Delta_{anchorSync,5}$ may be written as:

$$\Delta_{anchorSync,5} = \Delta_{anchorSync,1} + (e_B - e_A)T_{PRS\#1-to-\#5}, \quad \text{eq. 15}$$

Accordingly, when measuring a set of RSTD with a moving anchor (moving anchor B 1006) over time, only two RSTD measurement instances, illustrated in FIG. 11 as RSTD measurement instances 1110 and 1120 in FIG. 11, are needed for clock drift error mitigation. One or more of the remaining RSTD measurement instances, illustrated in FIG. 11 as RSTD measurement instance 1130, is not needed for determining the clock drift error mitigation, and accordingly, does not need an anchor-to-anchor procedure.

It should be understood that the anchor-to-anchor procedure to produce the RxTx time differences for two corresponding sets of PRS transmitted by the anchor A 1002 and moving anchor B 1006 may be measured by the moving anchor B 1006, as illustrated in FIG. 11, or may be measured by the anchor A 1002.

Figure 12:
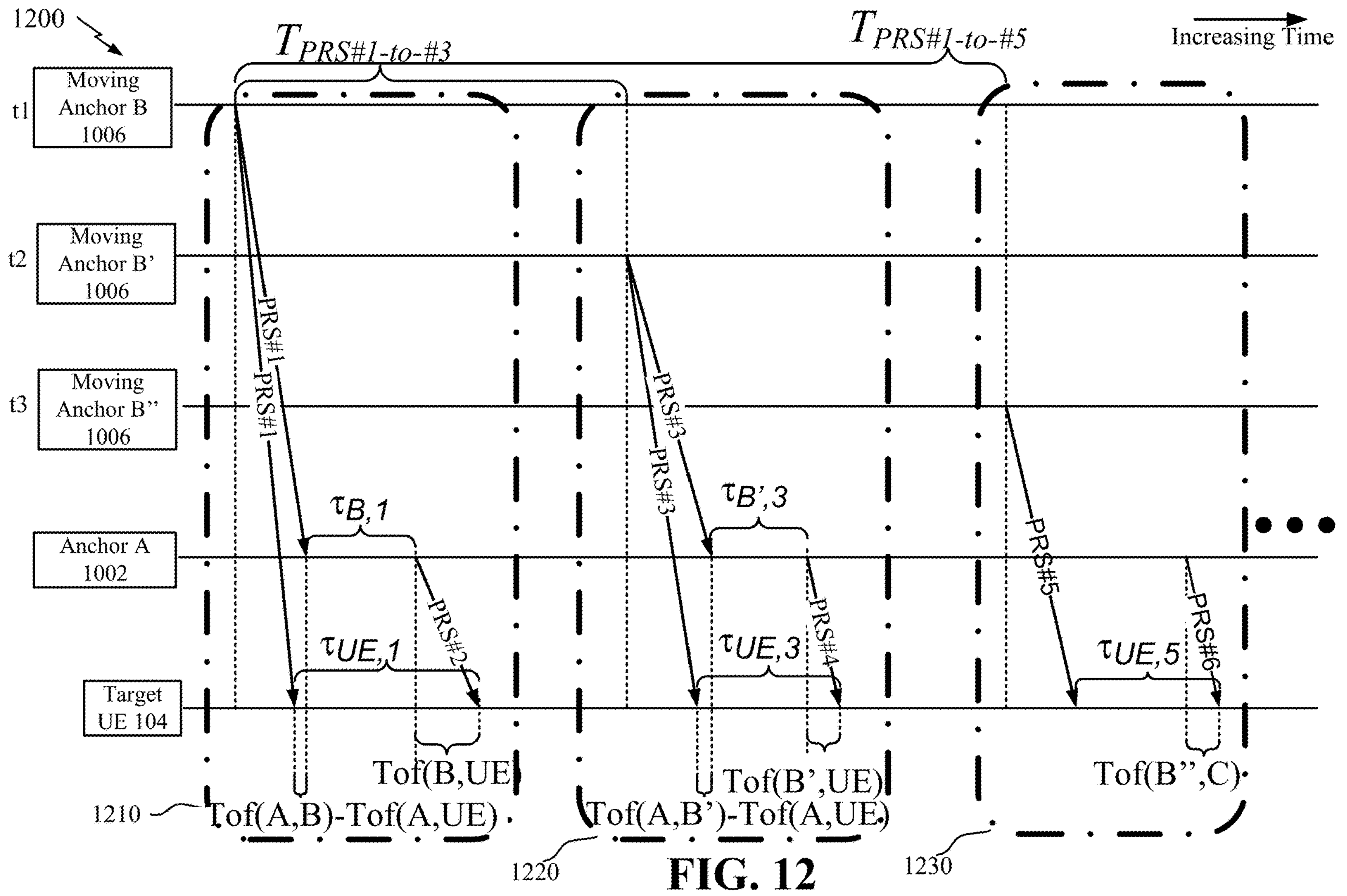
FIG. 12 illustrates another timing diagram of TDOA measurement signals exchanged between a UE and a stationary and moving anchor with improved accuracy.

FIG. 12, by way of example, illustrates an exemplary process 1200 for TDOA procedures that improves positioning accuracy for position estimation of the target UE 104 using time drift mitigation for a moving anchor. Process 1200 shown in FIG. 12 is similar to process 1100 shown in FIG. 11, but illustrates that the RxTx time difference labeled $\tau_{B,1}$ between receiving PRS #1 from moving anchor B 1006 (transmitted at time t1) and transmitting PRS #2 to the target UE 104 in RSTD measurement instance 1210 may be measured by fixed anchor A 1002 as $\hat{\tau}_{B,1}$, and the RxTx time difference labeled $\tau_{B',3}$ between receiving PRS #3 from moving anchor B' 1006 (transmitted at time t2) and transmitting PRS #4 to the target UE 104 in RSTD measurement instance 1220 may be measured by fixed anchor A 1002 as $\hat{\tau}_{B', 3'}$, while no RxTx time difference need be measured or reported in RSTD measurement instance 1230.

Figure 13:
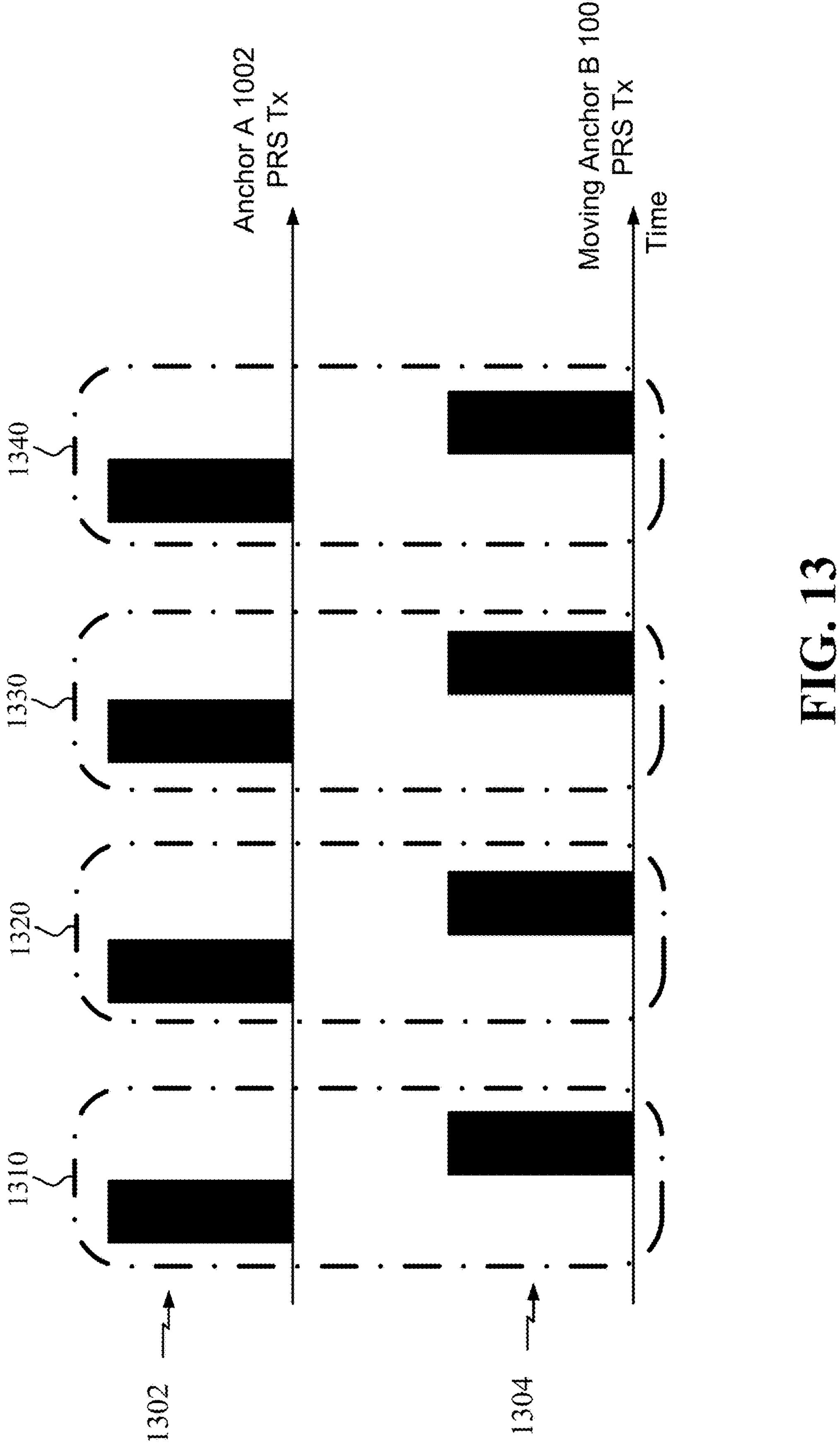
FIG. 13 illustrates PRS transmitted by a stationary anchor and moving anchor to produce a set of measurements for improved accuracy.

FIG. 13 is an illustration of the reference signals (PRS) transmitted by anchor A 1002 and moving anchor B 1006 to produce a set of RSTD measurements using clock drift error mitigation as discussed in FIG. 11. The set of RSTD measurements produced for the target UE 104 over time may be defined with a first PRS instance set 1302 of PRSs transmitted by the fixed anchor A 1002, and a second PRS instance set 1304 of PRS transmitted by the moving anchor B 1006, where corresponding pairs of PRSs from first PRS instance set 1302 and second PRS instance set 1304 produce RSTD measurement instances 1310, 1320, 1330, and 1340, identified by the dash-dot boxes.

As discussed above, only two RSTD measurement instances are needed for clock drift error mitigation. Thus, for the set of RSTDs produced using the moving anchor B 1006, only two anchor-to-anchor measurements are needed, i.e., RxTx time differences for two PRS from the first PRS instance set 1302 of PRS from anchor A 1002 and a corresponding two PRS from the second PRS instance set 1304 of PRS from moving anchor B 1006, e.g., in PRS pairs in RSTD measurement instances 1310 and 1330, should be measured and reported (e.g., to the location server or target UE 104) by the moving anchor B 1006 or by the fixed anchor A 1002, as illustrated in FIG. 12.

The two PRS instances for anchor-to-anchor RxTx time difference measurements should have a same RxTx timing error group (TEG) identity (ID) so that the difference in the RxTx time difference measurements (e.g., $\hat{\tau}_{B,1}-\hat{\tau}_{B',3}$) can mitigate some additive group delay. The two PRSs transmitted by any one of the two anchors in the two PRS instances, e.g., PRS #1 and PRS #3 or PRS #2 and PRS #4 shown in FIG. 11 or 12, should have a same Tx TEG ID, so that it can be assumed that the drift error increases linearly over time, e.g. without synchronization adjustment between PRS #1 and PRS #3 or PRS #2 and PRS #4.

In some implementations, the set of RSTD measurements for the target UE 104, e.g., illustrated in FIG. 11 or 12 may be triggered by a network entity or by the fixed anchor A 1002. The trigger may be based on a location request from the target UE 104 prior to triggering the set of RSTD measurements. The triggering message, for example, may indicate the first PRS instance set of PRS resources (PRS instance set 1302 from the anchor A 1002 in FIG. 13) and the second PRS instance set of PRS resources (PRS instance set 1304 from the moving anchor B 1006 in FIG. 13) to be associated with the set of RSTD measurements. For example, in some implementations, the first PRS instance set of PRS resources from the anchor A 1002 and the second PRS instance set of PRS resources from the moving anchor B 1006 that are selected for the PRS instance set of RSTD measurements may have a same periodicity.

Further, the two RSTD measurement instances for the anchor-to-anchor RxTx time difference measurements may be indicated in the triggering message. The two anchor-to-anchor RxTx time difference measurements, measured by the moving anchor B 1006 or the anchor A 1002 may be reported to the location calculation entity, i.e., the target UE 104 or the location server 172 (e.g., LMF 270).

The PRS resources from the moving anchor B 1006 may be reserved. For example, the PRS instance set of PRS resources (PRS instance set 1304 in FIG. 13) transmitted by the moving anchor B 1006 may be reserved by a network entity or by the fixed anchor A 1002. Moreover, the PRS instance set of PRS resources (PRS instance set 1304 in FIG. 13) transmitted by the moving anchor B 1006 may have a lifetime e.g. number of periodicities.

Figure 14:
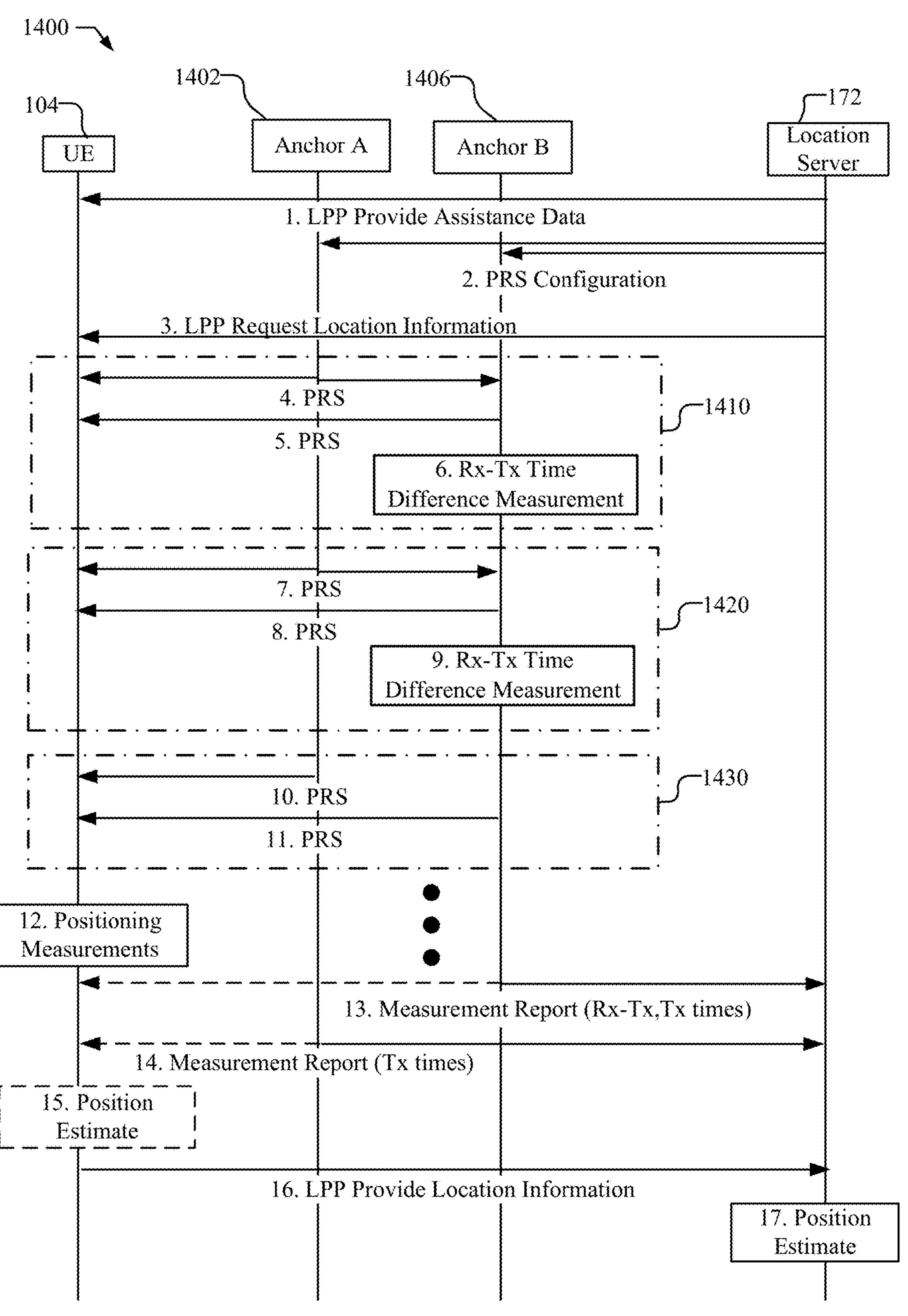
FIG. 14 is a message flow illustrating the messaging between a location server a target UE, a stationary anchor and moving anchor supporting measurements for improved accuracy.

FIG. 14 is a message flow 1400 illustrating the messaging between the location server 172, anchor A 1402, anchor B 1404, and the target UE 104 for supporting TDOA positioning of the UE using RSTD measurements from a moving anchor, as discussed herein. The location server 172, for example, may be an LMF 270. In one implementation, anchor A 1402 may be the fixed anchor A 1002 and anchor B 1404 may be the moving anchor B 1006 that performs two anchor-to-anchor RxTx time difference measurements, as illustrated in FIG. 11. In another implementation, anchor A 1402 may be the moving anchor B 1006 that performs two anchor-to-anchor RxTx time difference measurements, and anchor B 1404 may be the fixed anchor A 1002 as illustrated in FIG. 12. For ease of reference in FIG. 14, anchor A 1402 will be assumed to be the fixed anchor, while anchor B 1406 will be assumed to be the moving anchor, but it should be understood that anchor A 1402 may be the moving anchor and anchor B may be the fixed anchor in FIG. 14 without loss of generality. It should be understood that FIG. 14 illustrates messages that are related to the TDOA positioning of the target UE using the RSTD measurements discussed herein, but that additional messages, including conventional LPP messages, or fewer messages may be included in the message flow 1400. For example, messaging to establish the positioning session and to determine capabilities of the UE 104 may be exchanged or assistance data may not be included.

At stage 1, the location server 172 may send assistance data, e.g., in an LPP assistance data message, to the UE 104. The assistance data may include PRS configuration information for the anchors 1402 and 1406 and may identify the fixed anchor 1402 and the moving anchor 1406. The assistance data may further include the location of the fixed anchor, e.g., for a UE based positioning process. The location server 172 may provide the PRS configuration information for the PRS resources to be received by the target UE 104 from the anchor A 1402 and anchor B 1406.

At stage 2, the location server 172 may send the PRS configuration information to the anchors 1402 and 1406 to be transmitted to the target UE 104. The location server 172 may further provide to anchor B 1406 the PRS configuration information for the PRS resources to be transmitted by the anchor A 1402 that are to be detected by anchor B 1406. The location server 172, for example, may indicate the PRS instance set of PRS resources to be transmitted by anchor A 1402 and the PRS instance set of resources to be transmitted by anchor B 1406 that are to be associated with the set of RSTD measurements for the UE 104. The PRS instance sets of PRS resources, for example, may be selected to have a same periodicity. The location server 172 may indicate the RSTD measurement instances for the anchor-to-anchor RxTx time difference measurements by the anchor B 1406. The PRS in the anchor-to-anchor RxTx time difference measurements may have a same RxTx TEG ID. Moreover, the PRS transmitted by the stationary anchor entity, e.g., anchor A 1402 for the two anchor-to-anchor RxTx time difference measurements may have a same Tx TEG ID and/or the PRS transmitted by the moving anchor entity, e.g., anchor B 1406 for the two anchor-to-anchor RxTx time difference measurements may have a same Tx TEG ID. The PRS instance set of PRS resources to be transmitted by the moving anchor B 1406 may be reserved by a network entity, e.g., location server 172, or by the fixed anchor A 1402. Moreover, the PRS instance set of PRS resources transmitted by the moving anchor B 1406 may have a lifetime e.g. number of periodicities. The PRS to be transmitted by the moving anchor B 1406 may be reserved by the fixed anchor A 1402. In some implementations, the PRS configuration information may be sent by the fixed anchor A 1402 as opposed to the location server 172.

At stage 3, the location server 172 may send a location information request to the UE 104, e.g., in an LPP request location information message. The location information request or another message, for example, may trigger the set of RSTD measurements for the target UE 104. In some implementations, the stationary anchor entity, e.g., anchor A 1402, may send the trigger message to the target UE 104. The trigger request may be in response to a location request for the target UE 104. In some implementations, the triggering message, e.g., location information request, may provide PRS resource information for the PRS resources from the anchor entities to be measured for set of RSTD measurements. The request for example, may be for RSTD measurements for UE assisted positioning or for a location estimate (and optionally the RSTD measurements) for UE based positioning.

Blocks 1410, 1420, and 1430 illustrates different RSTD measurement instance over time, during which the position of the moving anchor B 1406 relative to the target UE 104 changes and thus, moving anchor B 1406 acts as multiple virtual anchors for the RSTD measurement instances. The moving anchor B 1406 may perform and report anchor-to-anchor RxTx time difference measurements in only two RSTD measurement instances, illustrated as RSTD 1410 and 1420, for clock drift error mitigation.

At stage 4 in RSTD measurement instance 1410, the anchor 1402 transmits a reference signal, e.g., (DL PRS) to the target UE 104 and the anchor 1406. The transmission of the PRS to the anchor 1406 may occur simultaneously with the transmission of the PRS to the target UE 104, or may occur after a transmission delay that is measured and reported and may be used in the RSTD measurement.

At stage 5 of RSTD measurement instance 1410, the anchor 1406 transmits a reference signal (e.g., SL or DL PRS) to the target UE 104.

At stage 6 of RSTD measurement instance 1410, the anchor 1406 measures a first RxTx time difference between reception of the PRS from the anchor 1402 in stage 4 and the transmission of the PRS to the target UE 104 in stage 5. The anchor 1406 may further record the time of transmission T_tx of the PRS transmitted to the target UE 104 in stage 5. The anchor 1406 additionally records its position during RSTD measurement instance 1410, which may be determined, e.g., from an accurate GNSS and/or terrestrial measurement that coincides with RSTD measurement instance 1410 or may be based a previously determined accurate position (e.g., GNSS and/or terrestrial measurement) that is updated using sensor information, as discussed above, e.g., in a dead-reckoning procedure.

At stage 7 in RSTD measurement instance 1420, the anchor 1402 transmits a reference signal, e.g., (DL PRS) to the target UE 104 and the anchor 1406. Similar to stage 4, the transmission of the PRS to the anchor 1406 may occur simultaneously with the transmission of the PRS to the target UE 104, or may occur after a transmission delay that is measured and reported and may be used in the RSTD measurement.

At stage 8 of RSTD measurement instance 1420, the anchor 1406 transmits a reference signal (e.g., SL or DL PRS) to the target UE 104, similar to stage 5.

At stage 9 of RSTD measurement instance 1420, the anchor 1406 measures a second RxTx time difference between reception of the PRS from the anchor 1402 in stage 7 and the transmission of the PRS to the target UE 104 in stage 8. The anchor 1406 may further record the time of transmission T_tx of the PRS transmitted to the target UE 104 in stage 8. The anchor 1406 additionally records its position during RSTD measurement instance 1420, which, similar to stage 6 may be determined, e.g., GNSS and/or terrestrial measurements or dead-reckoning using accurate GNSS and/or terrestrial measurements with sensor information.

At stage 10 of RSTD measurement instance 1430, the anchor 1402 transmits a reference signal, e.g., (DL PRS) to the target UE 104. The PRS transmitted in stage 10 need not be transmitted to or received by the anchor 1406.

At stage 11 of RSTD measurement instance 1430, the anchor 1406 transmits a reference signal (e.g., SL or DL PRS) to the target UE 104, similar to stage 8. Unlike RSTD measurement instances 1410 and 1420, in RSTD 1430, the anchor 1406 need not measure an RxTx time difference between reception of a PRS from the anchor 1402 and the transmission of the PRS to the target UE 104 in stage 10. The anchor 1406 may further record the time of transmission T_tx of the PRS transmitted to the target UE 104 in stage 11. The anchor 1406, however, may additionally record its position during RSTD measurement instance 1430, which, similar to stage 6 may be determined, e.g., GNSS and/or terrestrial measurements or dead-reckoning using accurate GNSS and/or terrestrial measurements with sensor information.

At stage 12, the UE 104 performs position measurements with the DL PRS received from anchor A 1402 and anchor B 1406 in stages 4 and 5, stages 7 and 8, and stages 10 and 11. The position measurements, for example, include an indication of the difference between the time of reception Rx of PRS from the anchor A 1402 and the time of reception of PRS from the anchor B 1404 at the target UE 104, e.g., the time difference (T_Rx-Rx), e.g., denoted as $\tau_{UE,1}$, $\tau_{UE,3}$, and $\tau_{UE,5}$, as illustrated in FIGS. 11 and 13, or the times of reception.

At stage 13, the anchor B 1406 provides a measurement report to the location calculation entity, i.e., the location server 172 or in some implementations (illustrated with the dotted line) the target UE 104. The measurement report may include the RxTx time difference measurements from RSTD measurement instances 1410 and 1420, the transmission times T_tx of the PRS transmitted in stages 5, 8, and 11, and position information (e.g., absolute positions for each time instance e.g. stage 5, 8 and 11) of the anchor B 1406 (assuming anchor B 1406 is the moving anchor).

At stage 14, the anchor A 1402 provides a measurement report to the location calculation entity, i.e., the location server 172 or in some implementations (illustrated with the dotted line) the target UE 104. The measurement report may include the transmission times T_tx of the PRS transmitted in stages 4, 7, and 10. In some implementations, the anchor A 1402 may provide its position if not provided in assistance data in stage 1 (or if the anchor A 1402 is the moving anchor).

At stage 15 as illustrated with a dotted box, for UE based positioning, the target UE 104 may generate a position estimate using TDOA, as discussed herein, using the positioning measurements performed as stage 12 and the measurement reports received from anchor B 1406 and anchor A 1402 in stages 13 and 14. The target UE 104 for example, may determine the time of flight $T_{oF}$ between the anchor A 1402 and the anchor B 1406 for each RSTD measurement instance 1410, 1420, 1430 based on the assistance data and the reported position of the moving anchor, e.g., in stage 13, clock drift error ($e_B$-$e_A$) using the measured quantities, including the RxTx time differences measured by the anchor B 1406, as described in reference to equation 13, and may determine the TDOA using measurements from RSTD measurement instances 1410, 1420, and 1430 and the clock drift error ($e_B$-$e_A$), e.g., as described in reference to equation 8 and equations 14, 15. Using the known locations of the anchors, e.g., as received in the assistance data in stage 1 and/or the determined TDOAs, the position of the UE 104 may be estimated using multilateration.

At stage 16, the UE 104 sends the location information to the location server 172 in an LPP provide location information message. The location information, for example, may include the determined position estimate from stage 15 and/or position measurements determined at stage 12, e.g., an indication of the difference between the time of reception of the PRS from the anchor A 1402 and the time of reception of the PRS from the anchor 1406. For example, the location information may include the difference in the reception times of the PRS, or the reception times.

At stage 17, the location server 172 may determine a position estimate for the target UE 104 or verify the position estimate from the UE 104 based on the location information received in the messages in stages 13, 14, and 16. The location server 172 may determine the position of the target UE 104 using TDOA, as discussed herein. The location server 172, for example, may determine the time of flight $T_{oF}$ between the anchor A 1402 and the anchor B 1406 for each RSTD measurement instance 1410, 1420, 1430 based on the known position of the fixed anchor and the reported position of the moving anchor, e.g., from stage 13, the clock drift error ($e_B$-$e_A$) using the measured quantities, including the RxTx time differences measured by the anchor B 1406, as described in reference to equation 13, and the TDOA using measurements from RSTD measurement instances 1410, 1420, and 1430 and the clock drift error ($e_B$-$e_A$), e.g., as described in reference to equation 7 and equations 14, 15. Using the known locations of the anchors, and the determined TDOAs, the position of the UE 104 may be estimated using multilateration.

Figure 15:
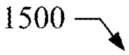
FIG. 15 shows a flowchart for an exemplary process for supporting operation of a position estimation entity for determining a position of a target UE as disclosed herein.
Figure 15:
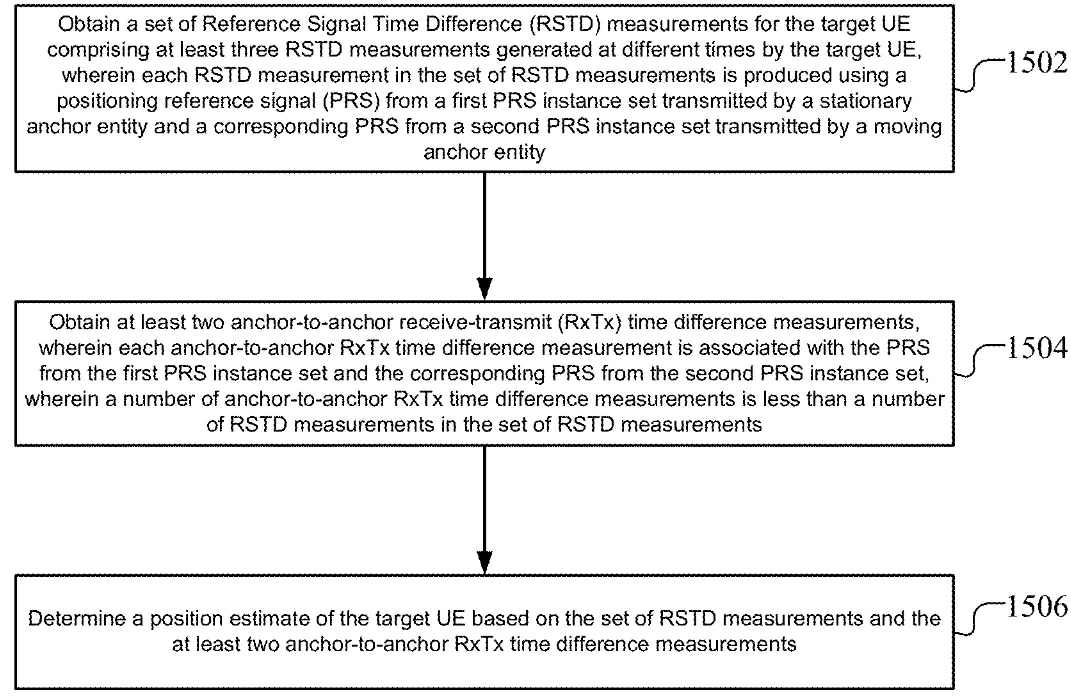

FIG. 15 shows a flowchart for an exemplary process 1500 for supporting operation of a position estimation entity for determining a position of a target UE. In one implementation, the process, for example, may be performed by a location server, such as location server 172 shown in FIG. 1A or LMF 270 or SLP 268 shown in FIG. 2B. In one implementation, the process may be performed by the target UE, e.g., target UE 104 shown in FIG. 1A.

At block 1502, the position estimation entity may obtain a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity, e.g., as illustrated in FIGS. 10-13 and in stage 12 or stage 16 of FIG. 14. The stationary anchor entity, for example, may be anchor A 1002 illustrated in FIGS. 10-13 or the anchor A 1402 or anchor B 1406 in FIG. 14. The moving anchor entity, for example, may be the moving anchor B 1006 illustrated in FIGS. 10-13 or the anchor A 1402 or anchor B 1406 in FIG. 14. A means for obtaining a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity may include the at least one WWAN transceiver 310 or at least one short-range wireless transceiver 320 and the at least one processor 332 with dedicated hardware or implementing executable code or software instructions in memory 340, such as the PRS module 342 in UE 302 shown in FIG. 3A or the at least one network interface 390 and at least one processor 394 with dedicated hardware or implementing executable code or software instructions in memory 396, such as the PRS module 398 in the network entity 306 shown in FIG. 3C.

At block 1504, the position estimation entity may obtain at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements, e.g., as illustrated in FIGS. 10-13 and in stages 6, 9, and 13 of FIG. 14. A means for obtaining at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements may include the at least one WWAN transceiver 310 or at least one short-range wireless transceiver 320 and the at least one processor 332 with dedicated hardware or implementing executable code or software instructions in memory 340, such as the PRS module 342 in UE 302 shown in FIG. 3A or the at least one network interface 390 and at least one processor 394 with dedicated hardware or implementing executable code or software instructions in memory 396, such as the PRS module 398 in the network entity 306 shown in FIG. 3C.

At block 1506, the position estimation entity may determine a position estimate of the target UE based on the set of RSTD measurements and the at least two anchor-to-anchor RxTx time difference measurements, e.g., as illustrated in FIGS. 10-13 and in stage 15 or stage 17 of FIG. 14. A means for determining a position estimate of the target UE based on the set of RSTD measurements and the at least two anchor-to-anchor RxTx time difference measurements may include the at least one WWAN transceiver 310 or at least one short-range wireless transceiver 320 and the at least one processor 332 with dedicated hardware or implementing executable code or software instructions in memory 340, such as the PRS module 342 in UE 302 shown in FIG. 3A or the at least one network interface 390 and at least one processor 394 with dedicated hardware or implementing executable code or software instructions in memory 396, such as the PRS module 398 in the network entity 306 shown in FIG. 3C.

In one implementation, each anchor-to-anchor RxTx time difference measurement is either a measurement performed by the moving anchor entity based on reception of a first PRS in the first PRS instance set and transmission of a second PRS in the second PRS instance set or a measurement performed by the stationary anchor entity based on reception of a third PRS in the second PRS instance set and transmission of a fourth PRS in the first PRS instance set, e.g., as discussed in FIGS. 11 and 12, respectively, and discussed in FIG. 14 including stage 6 and 9.

In one implementation, the PRS from the first PRS instance set and the corresponding PRS from the second PRS instance set in the at least two anchor-to-anchor RxTx time difference measurements have a same RxTx timing error group identifier, e.g., as discussed in FIG. 13 and stage 2 of FIG. 14.

In one implementation, the PRS transmitted by the stationary anchor entity in the first PRS instance set associated with the at least two anchor-to-anchor RxTx time difference measurements have a same transmit timing error group identifier, e.g., as discussed in FIG. 13 and stage 2 of FIG. 14.

In one implementation, PRS transmitted by the moving anchor entity in the second PRS instance set associated with the at least two anchor-to-anchor RxTx time difference measurements have a same transmit timing error group identifier, e.g., as discussed in FIG. 13 and stage 2 of FIG. 14.

In one implementation, the set of RSTD measurements for the target UE are triggered by a location server or by the stationary anchor entity, e.g., as discussed in FIG. 13 and stage 3 of FIG. 14. The set of RSTD measurements for the target UE, for example, may be triggered based on a location request from the target UE, e.g., as discussed in FIG. 13 and stage 3 of FIG. 14. A triggering message sent to the target UE to trigger the set of RSTD measurements for the target UE may indicate PRS resources in the first PRS instance set and the second PRS instance set, e.g., as discussed in FIG. 13 and stage 3 of FIG. 14. The PRS resources in the first PRS instance set and the second PRS instance set may have a same periodicity, e.g., as discussed in FIG. 13 and stage 2 of FIG. 14. A triggering message indicates PRS resources in the first PRS instance set for the at least two anchor-to-anchor RxTx time difference measurements, e.g., as discussed in FIG. 13 and stage 2 of FIG. 14.

In one implementation, the position estimation entity is a location server and wherein the at least two anchor-to-anchor RxTx time difference measurements are received from one of the stationary anchor entity and the moving anchor entity, e.g., as discussed in stages 13 and 17 of FIG. 14.

In one implementation, the position estimation entity is the target UE and wherein the at least two anchor-to-anchor RxTx time difference measurements are received from one of the stationary anchor entity and the moving anchor entity, e.g., as discussed in stages 13 and 15 of FIG. 14.

In one implementation, the PRS in the second PRS instance set transmitted by the moving anchor entity for the set of RSTD measurements is reserved by the stationary anchor entity, e.g., as discussed in FIG. 13 and stage 2 of FIG. 14.

In one implementation, the PRS in the second PRS instance set transmitted by the moving anchor entity for the set of RSTD measurements have a limit on a number of periods, e.g., as discussed in FIG. 13 and stage 2 of FIG. 14.

Reference throughout this specification to “one example”, “an example”, “certain examples”, or “exemplary implementation” means that a particular feature, structure, or characteristic described in connection with the feature and/or example may be included in at least one feature and/or example of claimed subject matter. Thus, the appearances of the phrase “in one example”, “an example”, “in certain examples” or “in certain implementations” or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as “processing,” “computing,” “calculating,” “determining” or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method of operating a position estimation entity for determining a position of a target user equipment (UE), comprising: obtaining a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; obtaining at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determining a position estimate of the target UE based on the set of RSTD measurements and the at least two anchor-to-anchor RxTx time difference measurements.

Clause 2. The method of clause 1, wherein each anchor-to-anchor RxTx time difference measurement is either a measurement performed by the moving anchor entity based on reception of a first PRS in the first PRS instance set and transmission of a second PRS in the second PRS instance set or a measurement performed by the stationary anchor entity based on reception of a third PRS in the second PRS instance set and transmission of a fourth PRS in the first PRS instance set.

Clause 3. The method of any of clauses 1-2, wherein the PRS from the first PRS instance set and the corresponding PRS from the second PRS instance set in the at least two anchor-to-anchor RxTx time difference measurements have a same RxTx timing error group identifier.

Clause 4. The method of any of clauses 1-3, wherein PRS transmitted by the stationary anchor entity in the first PRS instance set associated with the at least two anchor-to-anchor RxTx time difference measurements have a same transmit timing error group identifier.

Clause 5. The method of any of clauses 1-4, wherein PRS transmitted by the moving anchor entity in the second PRS instance set associated with the at least two anchor-to-anchor RxTx time difference measurements have a same transmit timing error group identifier.

Clause 6. The method of any of clauses 1-5, wherein the set of RSTD measurements for the target UE are triggered by a location server or by the stationary anchor entity.

Clause 7. The method of clause 6, wherein the set of RSTD measurements for the target UE are triggered based on a location request from the target UE.

Clause 8. The method of any of clauses 6-7, wherein a triggering message sent to the target UE to trigger the set of RSTD measurements for the target UE indicates PRS resources in the first PRS instance set and the second PRS instance set.

Clause 9. The method of clause 8, wherein the PRS resources in the first PRS instance set and the second PRS instance set have a same periodicity.

Clause 10. The method of any of clauses 6-9, wherein a triggering message indicates PRS resources in the first PRS instance set for the at least two anchor-to-anchor RxTx time difference measurements.

Clause 11. The method of any of clauses 1-10, wherein the position estimation entity is a location server and wherein the at least two anchor-to-anchor RxTx time difference measurements are received from one of the stationary anchor entity and the moving anchor entity.

Clause 12. The method of any of clauses 1-10, wherein the position estimation entity is the target UE and wherein the at least two anchor-to-anchor RxTx time difference measurements are received from one of the stationary anchor entity and the moving anchor entity.

Clause 13. The method of any of clauses 1-12, wherein the PRS in the second PRS instance set transmitted by the moving anchor entity for the set of RSTD measurements is reserved by the stationary anchor entity.

Clause 14. The method of any of clauses 1-13, wherein the PRS in the second PRS instance set transmitted by the moving anchor entity for the set of RSTD measurements have a limit on a number of periods.

Clause 15. A position estimation entity configured for determining a position of a target user equipment (UE), comprising: a memory; at least one external interface; and at least one processor communicatively coupled to the memory and the at least one external interface, the at least one processor configured to: obtain a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; obtain at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determine a position estimate of the target UE based on the set of RSTD measurements and the at least two anchor-to-anchor RxTx time difference measurements.

Clause 16. The position estimation entity of clause 15, wherein each anchor-to-anchor RxTx time difference measurement is either a measurement performed by the moving anchor entity based on reception of a first PRS in the first PRS instance set and transmission of a second PRS in the second PRS instance set or a measurement performed by the stationary anchor entity based on reception of a third PRS in the second PRS instance set and transmission of a fourth PRS in the first PRS instance set.

Clause 17. The position estimation entity of any of clauses 15-16, wherein the PRS from the first PRS instance set and the corresponding PRS from the second PRS instance set in the at least two anchor-to-anchor RxTx time difference measurements have a same RxTx timing error group identifier.

Clause 18. The position estimation entity of any of clauses 15-17, wherein PRS transmitted by the stationary anchor entity in the first PRS instance set associated with the at least two anchor-to-anchor RxTx time difference measurements have a same transmit timing error group identifier.

Clause 19. The position estimation entity of any of clauses 15-18, wherein PRS transmitted by the moving anchor entity in the second PRS instance set associated with the at least two anchor-to-anchor RxTx time difference measurements have a same transmit timing error group identifier.

Clause 20. The position estimation entity of any of clauses 15-19, wherein the set of RSTD measurements for the target UE are triggered by a location server or by the stationary anchor entity.

Clause 21. The position estimation entity of clause 20, wherein the set of RSTD measurements for the target UE are triggered based on a location request from the target UE.

Clause 22. The position estimation entity of any of clauses 20-21, wherein a triggering message sent to the target UE to trigger the set of RSTD measurements for the target UE indicates PRS resources in the first PRS instance set and the second PRS instance set.

Clause 23. The position estimation entity of clause 22, wherein the PRS resources in the first PRS instance set and the second PRS instance set have a same periodicity.

Clause 24. The position estimation entity of any of clauses 20-23, wherein a triggering message indicates PRS resources in the first PRS instance set for the at least two anchor-to-anchor RxTx time difference measurements.

Clause 25. The position estimation entity of any of clauses 15-24, wherein the position estimation entity is a location server and wherein the at least one external interface comprises at least one network interface and the at least two anchor-to-anchor RxTx time difference measurements are received from one of the stationary anchor entity and the moving anchor entity.

Clause 26. The position estimation entity of any of clauses 15-24, wherein the position estimation entity is the target UE and wherein the at least one external interface comprises at least one wireless transceiver and the at least two anchor-to-anchor RxTx time difference measurements are received from one of the stationary anchor entity and the moving anchor entity.

Clause 27. The position estimation entity of any of clauses 15-26, wherein the PRS in the second PRS instance set transmitted by the moving anchor entity for the set of RSTD measurements is reserved by the stationary anchor entity.

Clause 28. The position estimation entity of any of clauses 15-27, wherein the PRS in the second PRS instance set transmitted by the moving anchor entity for the set of RSTD measurements have a limit on a number of periods.

Clause 29. A position estimation entity configured for determining a position of a target user equipment (UE), comprising: means for obtaining a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; means for obtaining at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and means for determining a position estimate of the target UE based on the set of RSTD measurements and the at least two anchor-to-anchor RxTx time difference measurements.

Clause 30. The position estimation entity of clause 29, wherein each anchor-to-anchor RxTx time difference measurement is either a measurement performed by the moving anchor entity based on reception of a first PRS in the first PRS instance set and transmission of a second PRS in the second PRS instance set or a measurement performed by the stationary anchor entity based on reception of a third PRS in the second PRS instance set and transmission of a fourth PRS in the first PRS instance set.

Clause 31. The position estimation entity of any of clauses 29-30, wherein the PRS from the first PRS instance set and the corresponding PRS from the second PRS instance set in the at least two anchor-to-anchor RxTx time difference measurements have a same RxTx timing error group identifier.

Clause 32. The position estimation entity of any of clauses 29-31, wherein PRS transmitted by the stationary anchor entity in the first PRS instance set associated with the at least two anchor-to-anchor RxTx time difference measurements have a same transmit timing error group identifier.

Clause 33. The position estimation entity of any of clauses 29-32, wherein PRS transmitted by the moving anchor entity in the second PRS instance set associated with the at least two anchor-to-anchor RxTx time difference measurements have a same transmit timing error group identifier.

Clause 34. The position estimation entity of any of clauses 29-33, wherein the set of RSTD measurements for the target UE are triggered by a location server or by the stationary anchor entity.

Clause 35. The position estimation entity of clause 34, wherein the set of RSTD measurements for the target UE are triggered based on a location request from the target UE.

Clause 36. The position estimation entity of any of clauses 34-35, wherein a triggering message sent to the target UE to trigger the set of RSTD measurements for the target UE indicates PRS resources in the first PRS instance set and the second PRS instance set.

Clause 37. The position estimation entity of clause 36, wherein the PRS resources in the first PRS instance set and the second PRS instance set have a same periodicity.

Clause 38. The position estimation entity of any of clauses 34-37, wherein a triggering message indicates PRS resources in the first PRS instance set for the at least two anchor-to-anchor RxTx time difference measurements.

Clause 39. The position estimation entity of any of clauses 29-38, wherein the position estimation entity is a location server and wherein the at least two anchor-to-anchor RxTx time difference measurements are received from one of the stationary anchor entity and the moving anchor entity.

Clause 40. The position estimation entity of any of clauses 29-38, wherein the position estimation entity is the target UE and wherein the at least two anchor-to-anchor RxTx time difference measurements are received from one of the stationary anchor entity and the moving anchor entity.

Clause 41. The position estimation entity of any of clauses 29-40, wherein the PRS in the second PRS instance set transmitted by the moving anchor entity for the set of RSTD measurements is reserved by the stationary anchor entity.

Clause 42. The position estimation entity of any of clauses 29-41, wherein the PRS in the second PRS instance set transmitted by the moving anchor entity for the set of RSTD measurements have a limit on a number of periods.

Clause 43. A non-transitory storage medium including program code stored thereon, the program code is operable to configure at least one processor in a position estimation entity for determining a position of a target user equipment (UE), the program comprising instructions to: obtain a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity; obtain at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determine a position estimate of the target UE based on the set of RSTD measurements and the at least two anchor-to-anchor RxTx time difference measurements.

Clause 44. The non-transitory storage medium of clause 43, wherein each anchor-to-anchor RxTx time difference measurement is either a measurement performed by the moving anchor entity based on reception of a first PRS in the first PRS instance set and transmission of a second PRS in the second PRS instance set or a measurement performed by the stationary anchor entity based on reception of a third PRS in the second PRS instance set and transmission of a fourth PRS in the first PRS instance set.

Clause 45. The non-transitory storage medium of any of clauses 43-44, wherein the PRS from the first PRS instance set and the corresponding PRS from the second PRS instance set in the at least two anchor-to-anchor RxTx time difference measurements have a same RxTx timing error group identifier.

Clause 46. The non-transitory storage medium of any of clauses 43-45, wherein PRS transmitted by the stationary anchor entity in the first PRS instance set associated with the at least two anchor-to-anchor RxTx time difference measurements have a same transmit timing error group identifier.

Clause 47. The non-transitory storage medium of any of clauses 43-46, wherein PRS transmitted by the moving anchor entity in the second PRS instance set associated with the at least two anchor-to-anchor RxTx time difference measurements have a same transmit timing error group identifier.

Clause 48. The non-transitory storage medium of any of clauses 43-47, wherein the set of RSTD measurements for the target UE are triggered by a location server or by the stationary anchor entity.

Clause 49. The non-transitory storage medium of clause 48, wherein the set of RSTD measurements for the target UE are triggered based on a location request from the target UE.

Clause 50. The non-transitory storage medium of any of clauses 48-49, wherein a triggering message sent to the target UE to trigger the set of RSTD measurements for the target UE indicates PRS resources in the first PRS instance set and the second PRS instance set.

Clause 51. The non-transitory storage medium of clause 50, wherein the PRS resources in the first PRS instance set and the second PRS instance set have a same periodicity.

Clause 52. The non-transitory storage medium of any of clauses 48-51, wherein a triggering message indicates PRS resources in the first PRS instance set for the at least two anchor-to-anchor RxTx time difference measurements.

Clause 53. The non-transitory storage medium of any of clauses 43-52, wherein the position estimation entity is a location server and wherein the at least two anchor-to-anchor RxTx time difference measurements are received from one of the stationary anchor entity and the moving anchor entity.

Clause 54. The non-transitory storage medium of any of clauses 43-52, wherein the position estimation entity is the target UE and wherein the at least two anchor-to-anchor RxTx time difference measurements are received from one of the stationary anchor entity and the moving anchor entity.

Clause 55. The non-transitory storage medium of any of clauses 43-54, wherein the PRS in the second PRS instance set transmitted by the moving anchor entity for the set of RSTD measurements is reserved by the stationary anchor entity.

Clause 56. The non-transitory storage medium of any of clauses 43-55, wherein the PRS in the second PRS instance set transmitted by the moving anchor entity for the set of RSTD measurements have a limit on a number of periods.

Therefore, it is intended that claimed subject matter not be limited to the particular examples disclosed, but that such claimed subject matter may also include all aspects falling within the scope of appended claims, and equivalents thereof.

What is claimed is:

1. A method of operating a position estimation entity for determining a position of a target user equipment (UE), comprising:

obtaining a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity;

obtaining at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determining a position estimate of the target UE based on the set of RSTD measurements and the at least two anchor-to-anchor RxTx time difference measurements.

2. The method of claim 1, wherein each anchor-to-anchor RxTx time difference measurement is either a measurement performed by the moving anchor entity based on reception of a first PRS in the first PRS instance set and transmission of a second PRS in the second PRS instance set or a measurement performed by the stationary anchor entity based on reception of a third PRS in the second PRS instance set and transmission of a fourth PRS in the first PRS instance set.

3. The method of claim 1, wherein the PRS from the first PRS instance set and the corresponding PRS from the second PRS instance set in the at least two anchor-to-anchor RxTx time difference measurements have a same RxTx timing error group identifier.

4. The method of claim 1, wherein PRS transmitted by the stationary anchor entity in the first PRS instance set associated with the at least two anchor-to-anchor RxTx time difference measurements have a same transmit timing error group identifier.

5. The method of claim 1, wherein PRS transmitted by the moving anchor entity in the second PRS instance set associated with the at least two anchor-to-anchor RxTx time difference measurements have a same transmit timing error group identifier.

6. The method of claim 1, wherein the set of RSTD measurements for the target UE are triggered by a location server or by the stationary anchor entity.

7. The method of claim 6, wherein the set of RSTD measurements for the target UE are triggered based on a location request from the target UE.

8. The method of claim 6, wherein a triggering message sent to the target UE to trigger the set of RSTD measurements for the target UE indicates PRS resources in the first PRS instance set and the second PRS instance set.

9. The method of claim 8, wherein the PRS resources in the first PRS instance set and the second PRS instance set have a same periodicity.

10. The method of claim 6, wherein a triggering message indicates PRS resources in the first PRS instance set for the at least two anchor-to-anchor RxTx time difference measurements.

11. The method of claim 1, wherein the position estimation entity is a location server and wherein the at least two anchor-to-anchor RxTx time difference measurements are received from one of the stationary anchor entity and the moving anchor entity.

12. The method of claim 1, wherein the position estimation entity is the target UE and wherein the at least two anchor-to-anchor RxTx time difference measurements are received from one of the stationary anchor entity and the moving anchor entity.

13. The method of claim 1, wherein the PRS in the second PRS instance set transmitted by the moving anchor entity for the set of RSTD measurements is reserved by the stationary anchor entity.

14. The method of claim 1, wherein the PRS in the second PRS instance set transmitted by the moving anchor entity for the set of RSTD measurements have a limit on a number of periods.

15. A position estimation entity configured for determining a position of a target user equipment (UE), comprising:

a memory;

at least one external interface; and at least one processor communicatively coupled to the memory and the at least one external interface, the at least one processor configured to:

obtain a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity;

obtain at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determine a position estimate of the target UE based on the set of RSTD measurements and the at least two anchor-to-anchor RxTx time difference measurements.

16. The position estimation entity of claim 15, wherein each anchor-to-anchor RxTx time difference measurement is either a measurement performed by the moving anchor entity based on reception of a first PRS in the first PRS instance set and transmission of a second PRS in the second PRS instance set or a measurement performed by the stationary anchor entity based on reception of a third PRS in the second PRS instance set and transmission of a fourth PRS in the first PRS instance set.

17. The position estimation entity of claim 15, wherein the PRS from the first PRS instance set and the corresponding PRS from the second PRS instance set in the at least two anchor-to-anchor RxTx time difference measurements have a same RxTx timing error group identifier.

18. The position estimation entity of claim 15, wherein PRS transmitted by the stationary anchor entity in the first PRS instance set associated with the at least two anchor-to-anchor RxTx time difference measurements have a same transmit timing error group identifier.

19. The position estimation entity of claim 15, wherein PRS transmitted by the moving anchor entity in the second PRS instance set associated with the at least two anchor-to-anchor RxTx time difference measurements have a same transmit timing error group identifier.

20. The position estimation entity of claim 15, wherein the set of RSTD measurements for the target UE are triggered by a location server or by the stationary anchor entity.

21. The position estimation entity of claim 20, wherein the set of RSTD measurements for the target UE are triggered based on a location request from the target UE.

22. The position estimation entity of claim 20, wherein a triggering message sent to the target UE to trigger the set of RSTD measurements for the target UE indicates PRS resources in the first PRS instance set and the second PRS instance set.

23. The position estimation entity of claim 22, wherein the PRS resources in the first PRS instance set and the second PRS instance set have a same periodicity.

24. The position estimation entity of claim 20, wherein a triggering message indicates PRS resources in the first PRS instance set for the at least two anchor-to-anchor RxTx time difference measurements.

25. The position estimation entity of claim 15, wherein the position estimation entity is a location server and wherein the at least one external interface comprises at least one network interface and the at least two anchor-to-anchor RxTx time difference measurements are received from one of the stationary anchor entity and the moving anchor entity.

26. The position estimation entity of claim 15, wherein the position estimation entity is the target UE and wherein the at least one external interface comprises at least one wireless transceiver and the at least two anchor-to-anchor RxTx time difference measurements are received from one of the stationary anchor entity and the moving anchor entity.

27. The position estimation entity of claim 15, wherein the PRS in the second PRS instance set transmitted by the moving anchor entity for the set of RSTD measurements is reserved by the stationary anchor entity.

28. The position estimation entity of claim 15, wherein the PRS in the second PRS instance set transmitted by the moving anchor entity for the set of RSTD measurements have a limit on a number of periods.

29. A position estimation entity configured for determining a position of a target user equipment (UE), comprising:

means for obtaining a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity;

means for obtaining at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and means for determining a position estimate of the target UE based on the set of RSTD measurements and the at least two anchor-to-anchor RxTx time difference measurements.

30. A non-transitory computer-readable storage medium including program code stored thereon, the program code is operable to configure at least one processor in a position estimation entity for determining a position of a target user equipment (UE), the program code comprising instructions to:

obtain a set of Reference Signal Time Difference (RSTD) measurements for the target UE comprising at least three RSTD measurements generated at different times by the target UE, wherein each RSTD measurement in the set of RSTD measurements is produced using a positioning reference signal (PRS) from a first PRS instance set transmitted by a stationary anchor entity and a corresponding PRS from a second PRS instance set transmitted by a moving anchor entity;

obtain at least two anchor-to-anchor receive-transmit (RxTx) time difference measurements, wherein each anchor-to-anchor RxTx time difference measurement is associated with the PRS from the first PRS instance set and the corresponding PRS from the second PRS instance set, wherein a number of anchor-to-anchor RxTx time difference measurements is less than a number of RSTD measurements in the set of RSTD measurements; and determine a position estimate of the target UE based on the set of RSTD measurements and the at least two anchor-to-anchor RxTx time difference measurements.

* * * * *